(12) United States Patent
Yamamoto et al.

(10) Patent No.: US 10,339,723 B2
(45) Date of Patent: Jul. 2, 2019

(54) GENERATING VIRTUAL NOTATION SURFACES WITH GESTURES IN AN AUGMENTED AND/OR VIRTUAL REALITY ENVIRONMENT

(71) Applicant: GOOGLE LLC, Mountain View, CA (US)

(72) Inventors: Darwin Yamamoto, Brooklyn, NY (US); Evan Moore, Brooklyn, NY (US); Ian MacGillivray, New York, NY (US); Jon Bedard, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/124,536

(22) Filed: Sep. 7, 2018

(65) Prior Publication Data

US 2019/0019348 A1 Jan. 17, 2019

Related U.S. Application Data

(63) Continuation of application No. 15/369,620, filed on Dec. 5, 2016, now Pat. No. 10,147,243.

(51) Int. Cl.
*G06T 19/20* (2011.01)
*G06F 3/01* (2006.01)

(52) U.S. Cl.
CPC .............. *G06T 19/20* (2013.01); *G06F 3/011* (2013.01); *G06F 3/017* (2013.01); *G06T 2219/004* (2013.01)

(58) Field of Classification Search
CPC ........... G06F 3/011; G06F 3/017; G06T 19/20
See application file for complete search history.

(56) References Cited

U.S. PATENT DOCUMENTS

| | | | |
|---|---|---|---|
| 8,881,051 B2 * | 11/2014 | Frey | G06F 3/013 715/800 |
| 2004/0193413 A1 * | 9/2004 | Wilson | G06F 3/017 704/243 |
| 2011/0199342 A1 | 8/2011 | Vartanian et al. | |
| 2015/0269783 A1 * | 9/2015 | Yun | G02B 27/0172 345/633 |
| 2016/0321841 A1 * | 11/2016 | Christen | G06T 19/006 |
| 2016/0371886 A1 * | 12/2016 | Thompson | G02B 27/0172 |
| 2017/0199580 A1 | 7/2017 | Hilliges et al. | |
| 2017/0228130 A1 | 8/2017 | Palmaro | |
| 2017/0309057 A1 * | 10/2017 | Vaganov | H04N 13/30 |

OTHER PUBLICATIONS

International Search Report and Written Opinion received for PCT Patent Application No. PCT/US2017/048962, dated Nov. 10, 2017, 12 pages.

* cited by examiner

*Primary Examiner* — Chun-Nan Lin
(74) *Attorney, Agent, or Firm* — Brake Hughes Bellermann LLP

(57) ABSTRACT

In an augmented reality and/or a virtual reality system, virtual annotation surfaces, or virtual sheets, or virtual whiteboards, may be materialized in response to a detected gesture. A user may annotate, adjust, store, review and revise the virtual annotation surfaces, and allow for collaboration with other users, while in the current virtual environment, and/or within another virtual environment, and/or outside of the virtual environment.

19 Claims, 29 Drawing Sheets

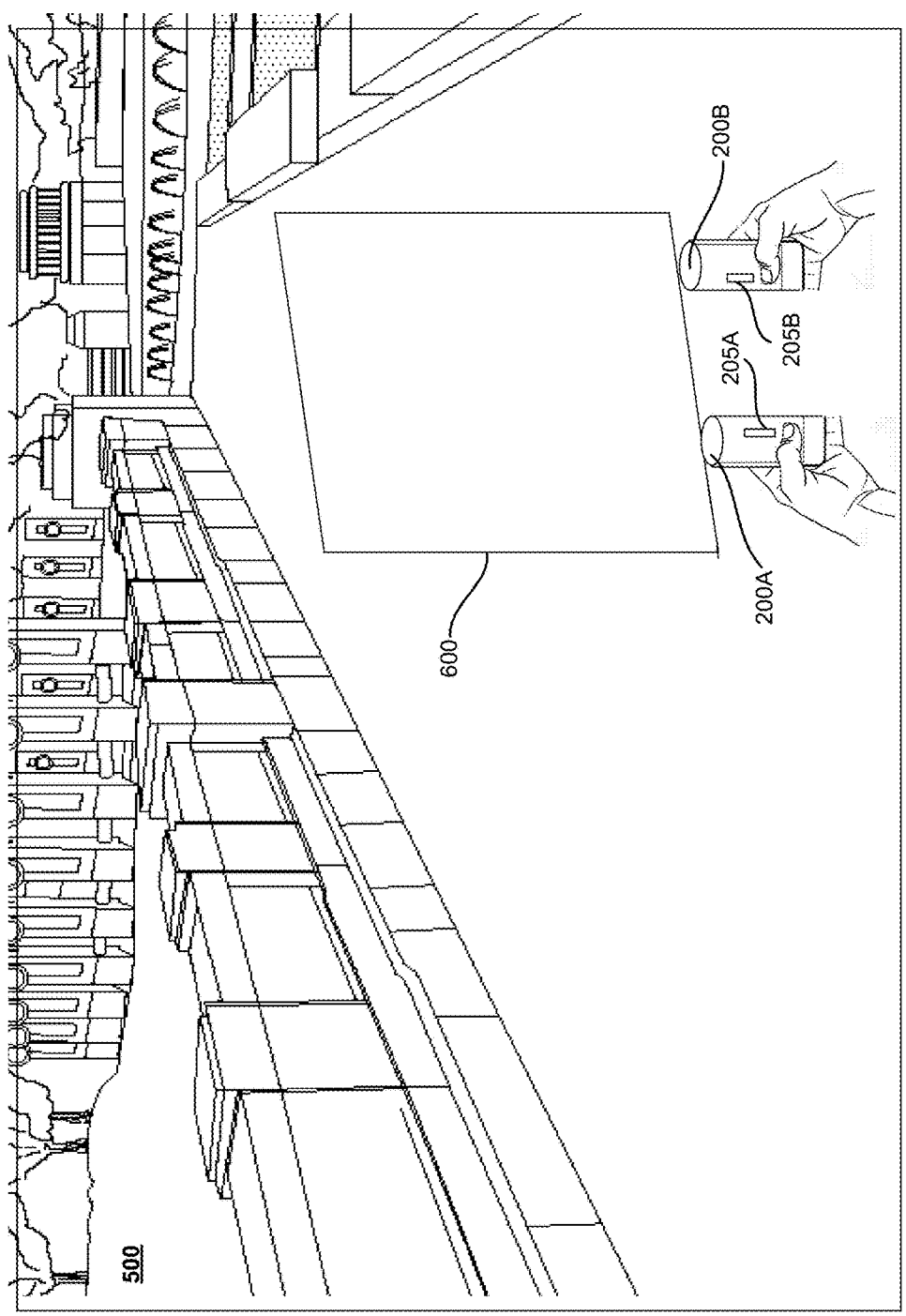

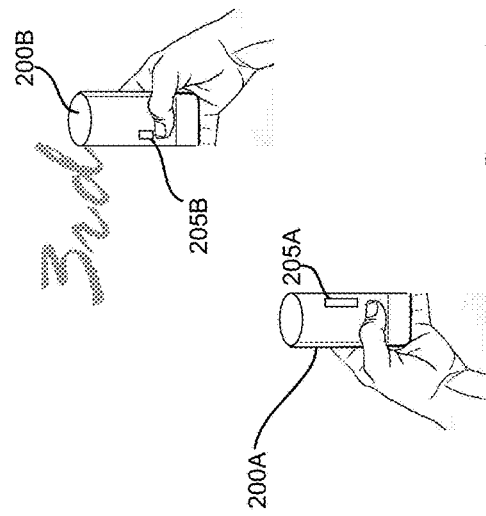
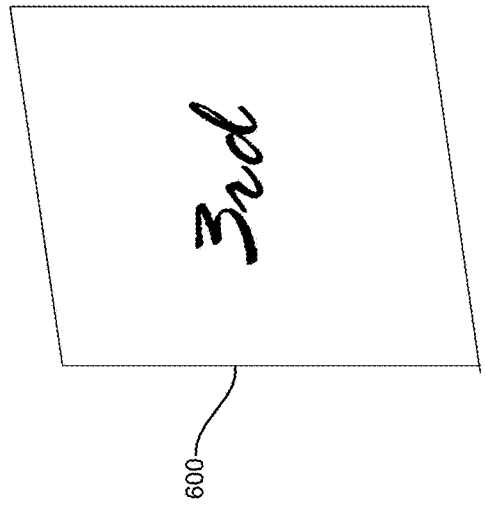
FIG. 5B
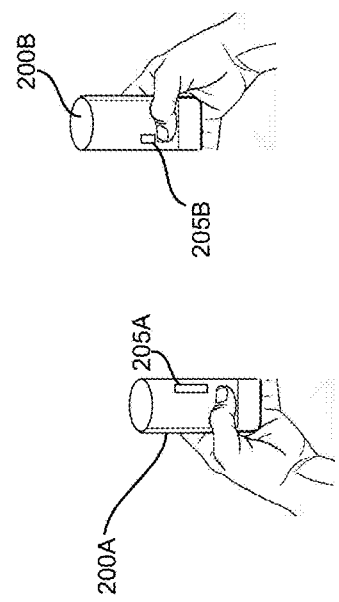
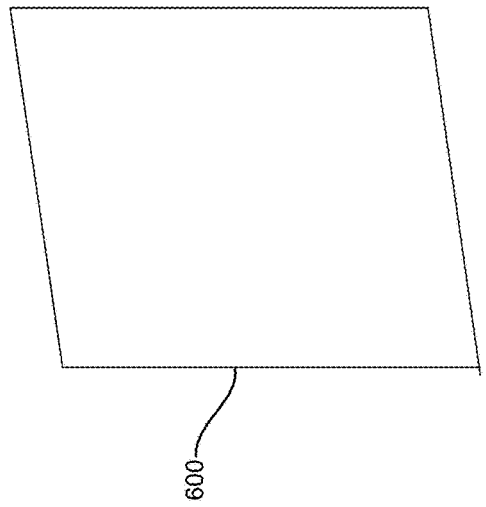
FIG. 5A

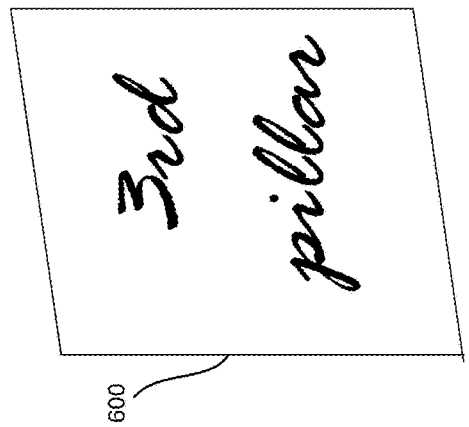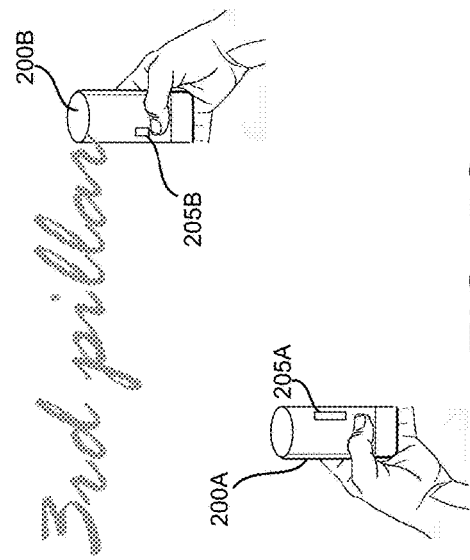
FIG. 5C

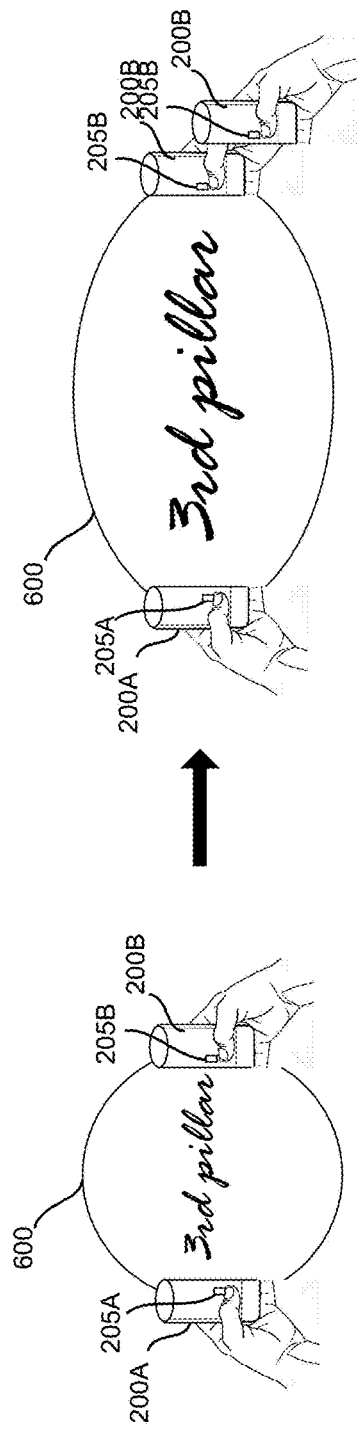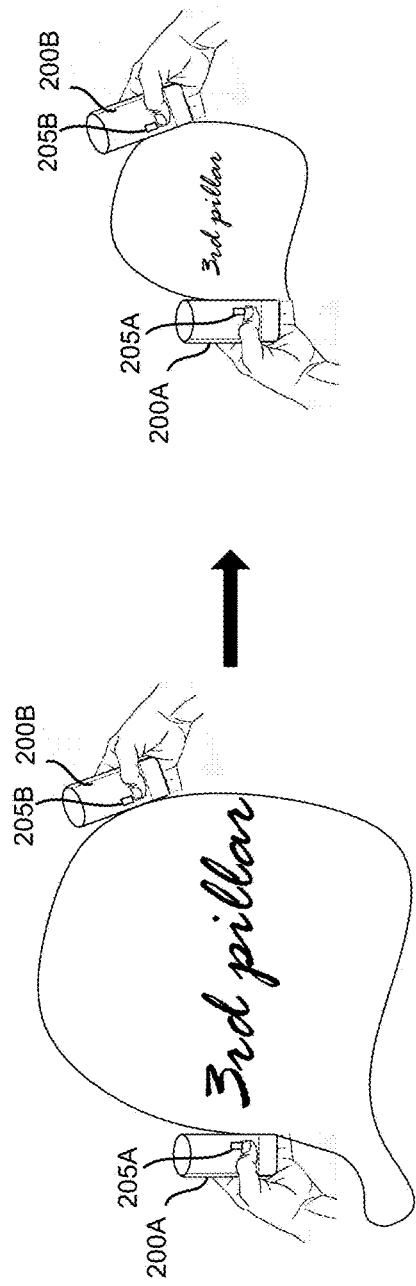
FIG. 5F
FIG. 5G

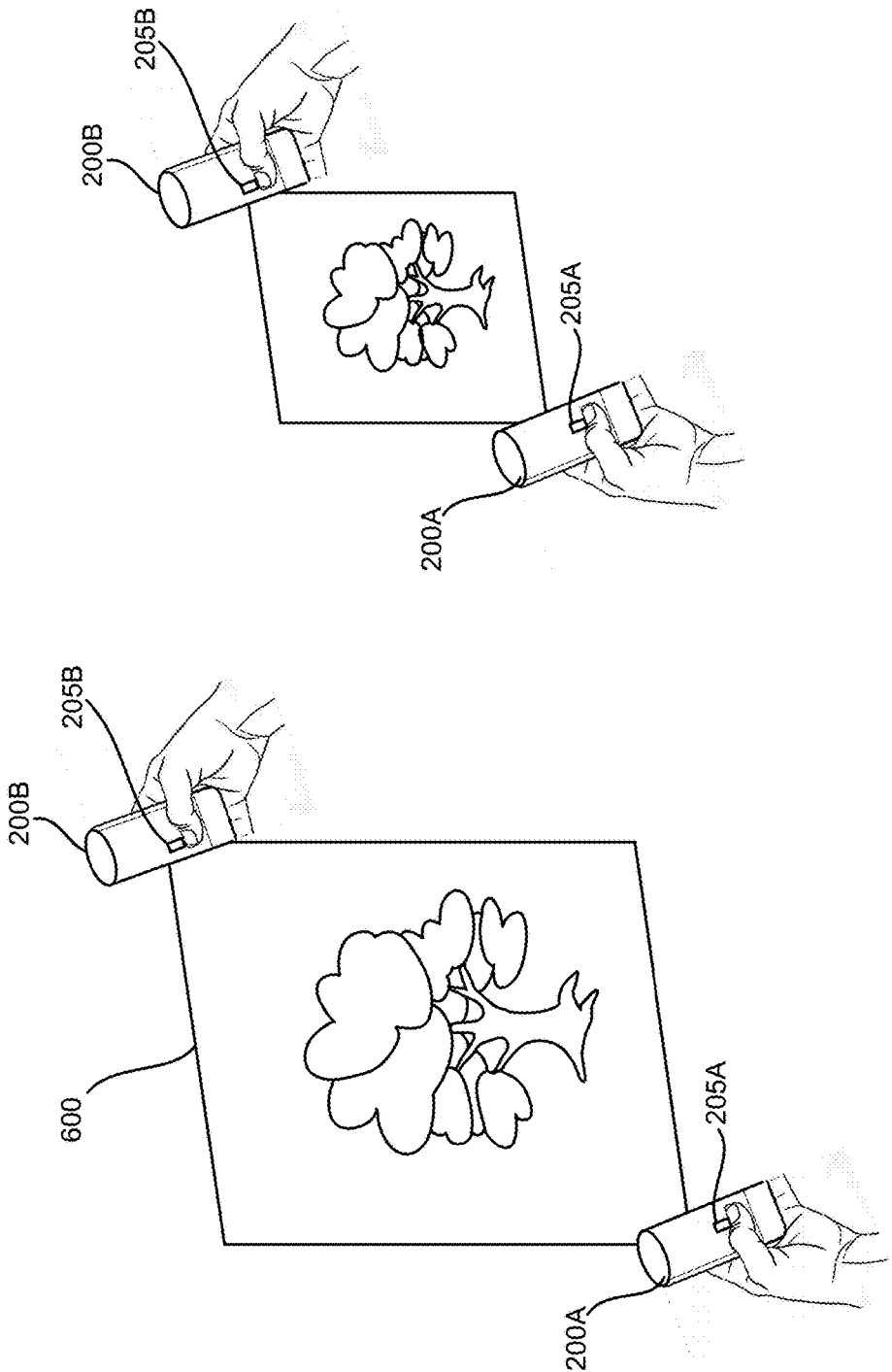

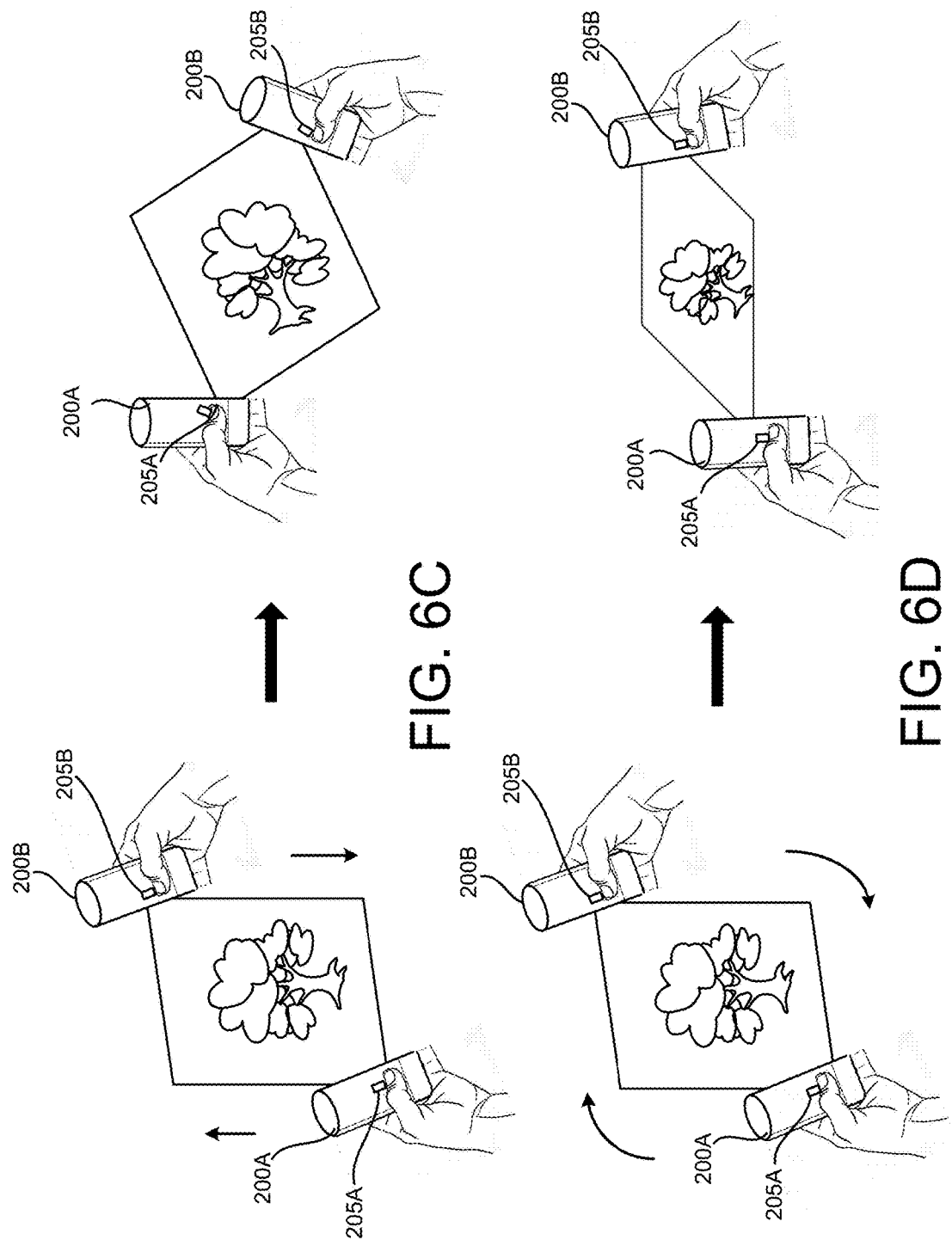

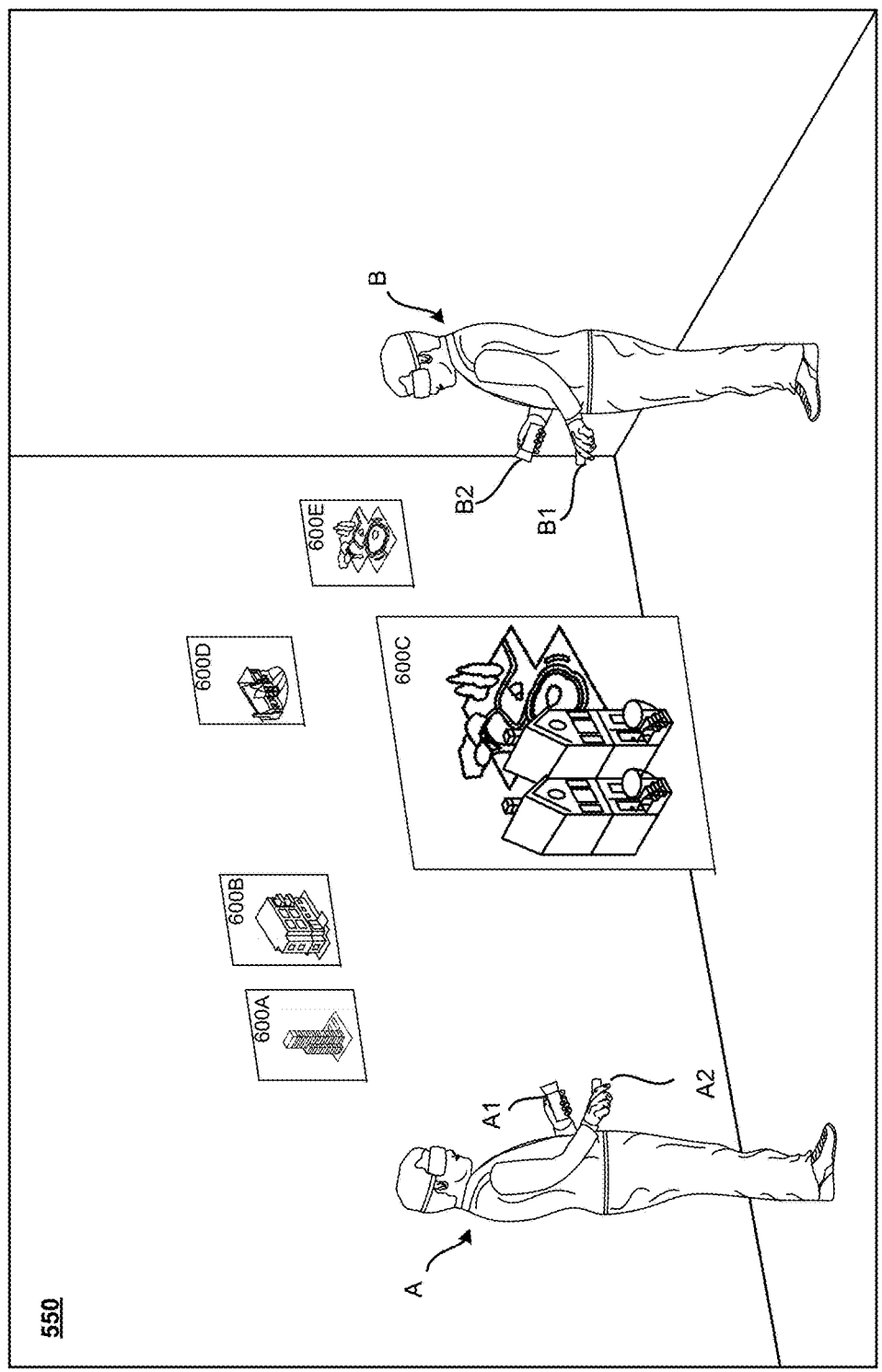

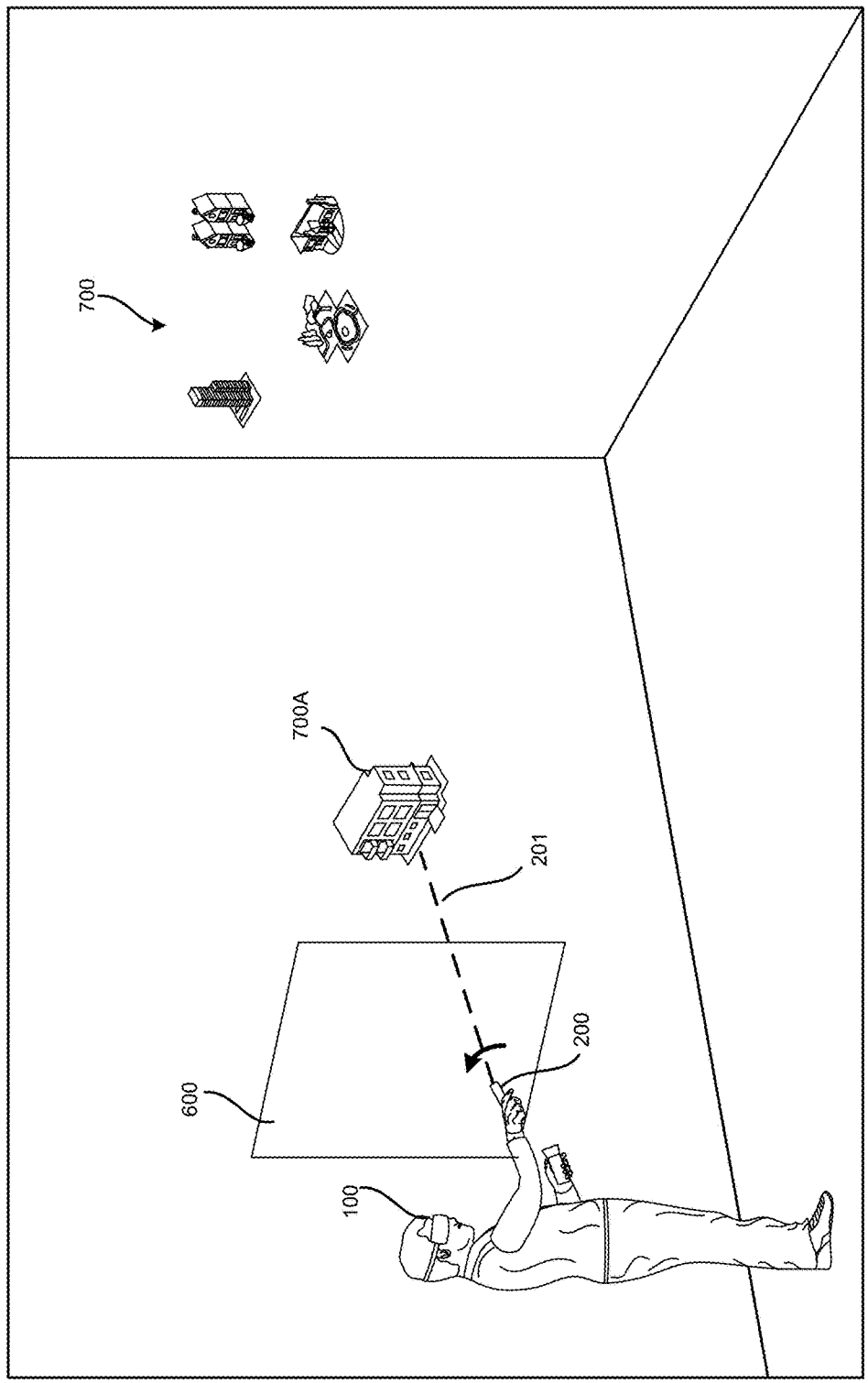

GENERATING VIRTUAL NOTATION SURFACES WITH GESTURES IN AN AUGMENTED AND/OR VIRTUAL REALITY ENVIRONMENT

CROSS REFERENCE TO RELATED APPLICATION

This application is a continuation of, and claims priority to, U.S. application Ser. No. 15/369,620, filed on Dec. 5, 2016, the disclosure of which is incorporated herein by reference in its entirety.

FIELD

This document relates, generally, to generating note taking surfaces with a gesture in an augmented reality and/or a virtual reality environment.

BACKGROUND

An augmented reality (AR) and/or virtual reality (VR) system may generate an immersive, three-dimensional (3D) virtual environment. A user may interact with objects in this virtual environment using various electronic devices, such as, for example, a helmet or other head mounted device including a display, glasses or goggles that a user looks through when viewing a display device, one or more hand-held electronic devices such as controllers, joysticks and the like, gloves fitted with sensors, keyboards, mouse, and other electronic devices.

SUMMARY

In one aspect, a method may include displaying, on a display of a head mounted display (HMD) device, a virtual environment, detecting, outside of the HMD, a gesture input, generating, in response to detection of the gesture input, a virtual notation surface, and displaying the virtual notation surface as a virtual object in the virtual environment, detecting, outside of the HMD, another gesture input and annotating the virtual notation surface based on the detected gesture input, and displaying the annotated virtual notation surface as a virtual object in the virtual environment.

In another aspect, a computing device configured to generate a virtual reality environment may include a memory storing executable instructions, and a processor configured to execute the instructions. The instructions may cause the computing device to display, on a display of a head mounted display (HMD) device, a virtual environment, detect, outside of the HMD, a first gesture input, generate, in response to detection of the first gesture input, a virtual notation surface, detect, outside of the HMD, a second gesture input, display, in response to detection of the second gesture input, the virtual notation surface as a virtual object in the virtual environment, detect, outside of the HMD, a third gesture input, annotate, in response to detection of the third gesture input, the virtual notation surface, and display the annotated virtual notation surface as a virtual object in the virtual environment.

In another aspect, a computer program product embodied on a non-transitory computer readable medium may have, stored thereon, a sequence of instructions. When executed by a processor, the instructions may cause the processor to execute a method, including displaying, on a display of a head mounted display (HMD) device, a virtual environment, detecting, outside of the HMD, a first gesture input, generating, in response to detection of the first gesture input, a virtual notation surface, detecting, outside of the HMD, a second gesture input, displaying, in response to detection of the second gesture input, the virtual notation surface as a virtual object in the virtual environment, detecting, outside of the HMD, a third gesture input, annotating, in response to detection of the third gesture input, the virtual notation surface, and displaying the annotated virtual notation surface as a virtual object in the virtual environment.

The details of one or more implementations are set forth in the accompanying drawings and the description below. Other features will be apparent from the description and drawings, and from the claims.

BRIEF DESCRIPTION OF THE DRAWINGS

FIGS. 4A-4H illustrate a system for materializing virtual notation surfaces in response to a detected user gesture in an augmented and/or virtual reality environment, in accordance with implementations as described herein.

FIGS. 5A-5G, 6A-6D and 7A-7L illustrate annotation and manipulation of virtual notation surfaces in augmented and/or virtual reality environments, in accordance with implementations as described herein.

DETAILED DESCRIPTION

Figure 1:
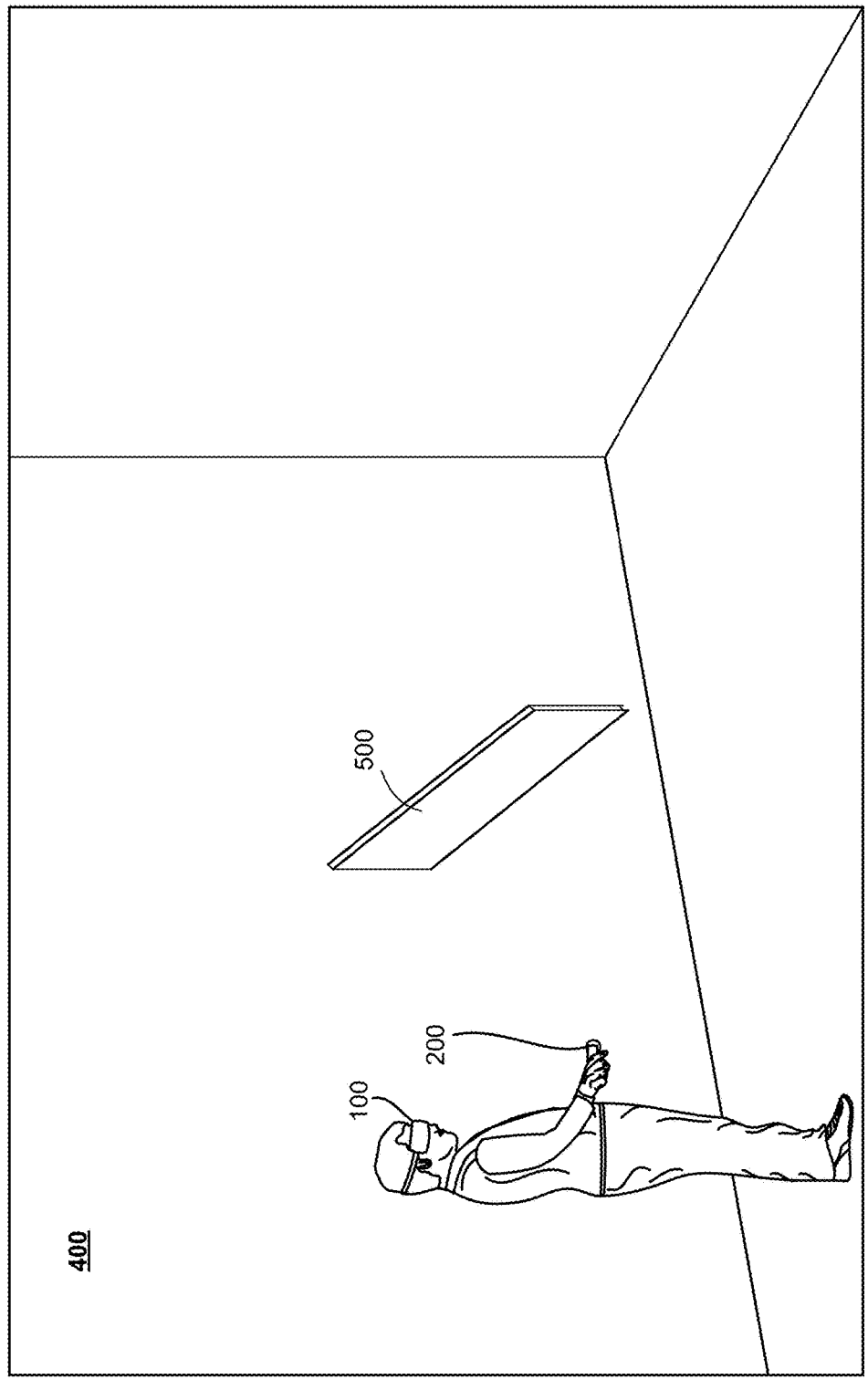
FIG. 1 is an example implementation of an augmented and/or virtual reality system including a head mounted display in communication with external input devices, in accordance with implementations as described herein.

A user immersed in an augmented and/or a virtual reality environment wearing, for example, a head mounted display (HMD) device may explore the virtual environment and interact with the virtual environment through various different types of inputs. These inputs may include, for example, manipulation of one or more electronic device(s) separate from the HMD and/or manipulation of the HMD itself, and/or hand/arm gestures, eye/head gaze, and the like. The user may manipulate various electronic devices, independently from or together with the HMD, to cause a desired action in the virtual environment. While immersed in the virtual environment, the user may have a need to record information, in the form of, for example, a sketch, a diagram, or other type of notation, which, in the real world, might be accomplished with pen and paper, a whiteboard, and the like. The ability to record a visual representation of a wide variety of different types of information in a similar manner, but without leaving the virtual environment may enhance the user's virtual experience. This ability to capture information, such as, for example, two dimensional sketches and other types of information, on a virtual surface may facilitate collaboration amongst multiple users in the virtual environment, further enhancing the user's experience in the virtual environment.

In a system and method, in accordance with implementations described herein, a user immersed in an augmented and/or a virtual reality environment may cause a virtual notation surface to be generated (e.g., materialized, produced) within the virtual environment. This virtual notation surface may be generated in the virtual environment in response to detection of a set user implemented gesture, or other type of input command. The notation surface may receive user annotations such as, for example, notes, sketches and the like, with these annotations being entered in response to user manipulation of the virtual notation surface using a virtual marking implement such as, for example, a controller, a virtual pen or paintbrush, a hand/finger, and the like. These annotations may be, for example, two dimensional sketches or other notes or other types of markings on a two dimensional virtual surface, somewhat mimicking the process a user may follow when finding the need to record a similar type of information in the real world. The annotations received on virtual surfaces may be stored and saved for future reference by the user, and/or by a subsequent user, and may be updated, further annotated, and/or otherwise revised, by the user and/or the subsequent user. A size and/or shape of the virtual notation surface may be adjusted in response to user manipulation. The ability to re-size and/or re-shape these virtual notation surfaces may allow the virtual surfaces to be adapted to a relatively large input scale of a particular virtual marking implement, and may also allow the resulting annotations on the virtual surfaces to be displayed at a reduced scale having improved granularity by further adjusting the size and/or scale of the virtual notation surface after entry of the annotation.

FIG. 1 is a third person view of a user wearing an HMD 100. In this example third person view, the user is in a physical space 400, in which the augmented/virtual reality system is operable, and is immersed in a virtual environment, viewing a virtual scene displayed on a display of the HMD 100. While the virtual scene is visible to the user within the HMD 100, a representation 500 of the virtual scene displayed to the user on a display of the HMD 100 is shown in FIG. 1, simply for ease of discussion and illustration. The user may interact with one or more external computing devices 200 that may be operably coupled with, and communicate with, the HMD 100. This may provide for communication between and the exchange of data between the external device(s) 200 and the HMD 100. As user inputs are received by the external device(s) 200, the user may interact with virtual objects in the virtual scene 500 generated by the HMD 100 based on the inputs received at the external device(s) 200. In the example shown in FIG. 1, the external device 200 operably coupled with the HMD 100 is a handheld electronic device 200, or handheld controller 200. In some implementations, multiple handheld electronic devices 200, for example, a first controller held by a first hand of the user and a second controller held by a second hand of the user, may be manipulated by the user for interaction with virtual elements of the virtual environment generated by the HMD 100. In some implementations, other external devices 200, such as, for example, a mouse, a keyboard, a joystick and the like, may be operably coupled to the HMD 100 to receive user input for interaction in the virtual environment. In some implementations, the system may detect user inputs for interaction in the virtual environment based on a detected and tracked position and/or orientation of other input devices, such as, for example, a user's arm and/or hand, and/or other body part.

Figure 2A:
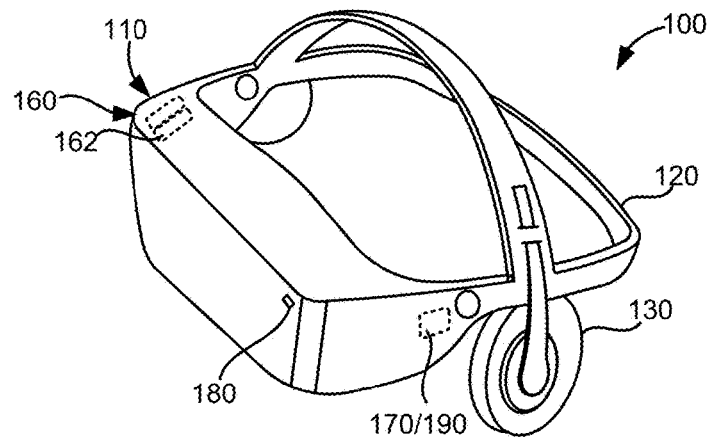
FIGS. 2A and 2B are perspective views of an example head mounted display device, in accordance with implementations as described herein.
Figure 2B:
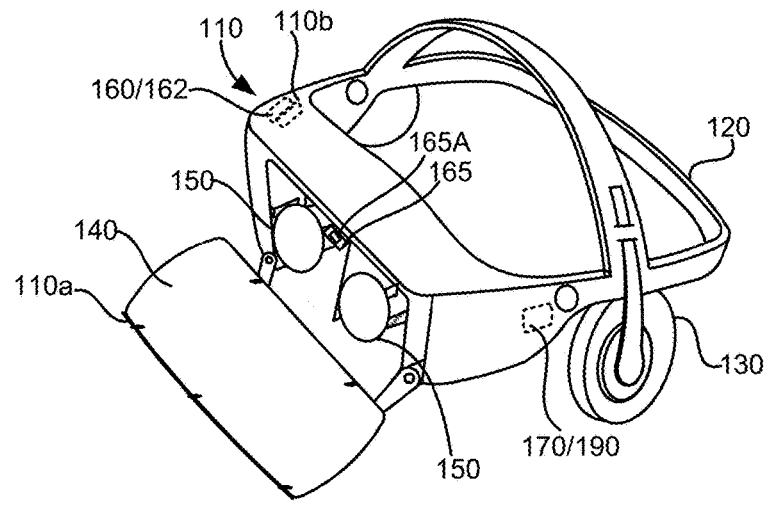
Figure 3:
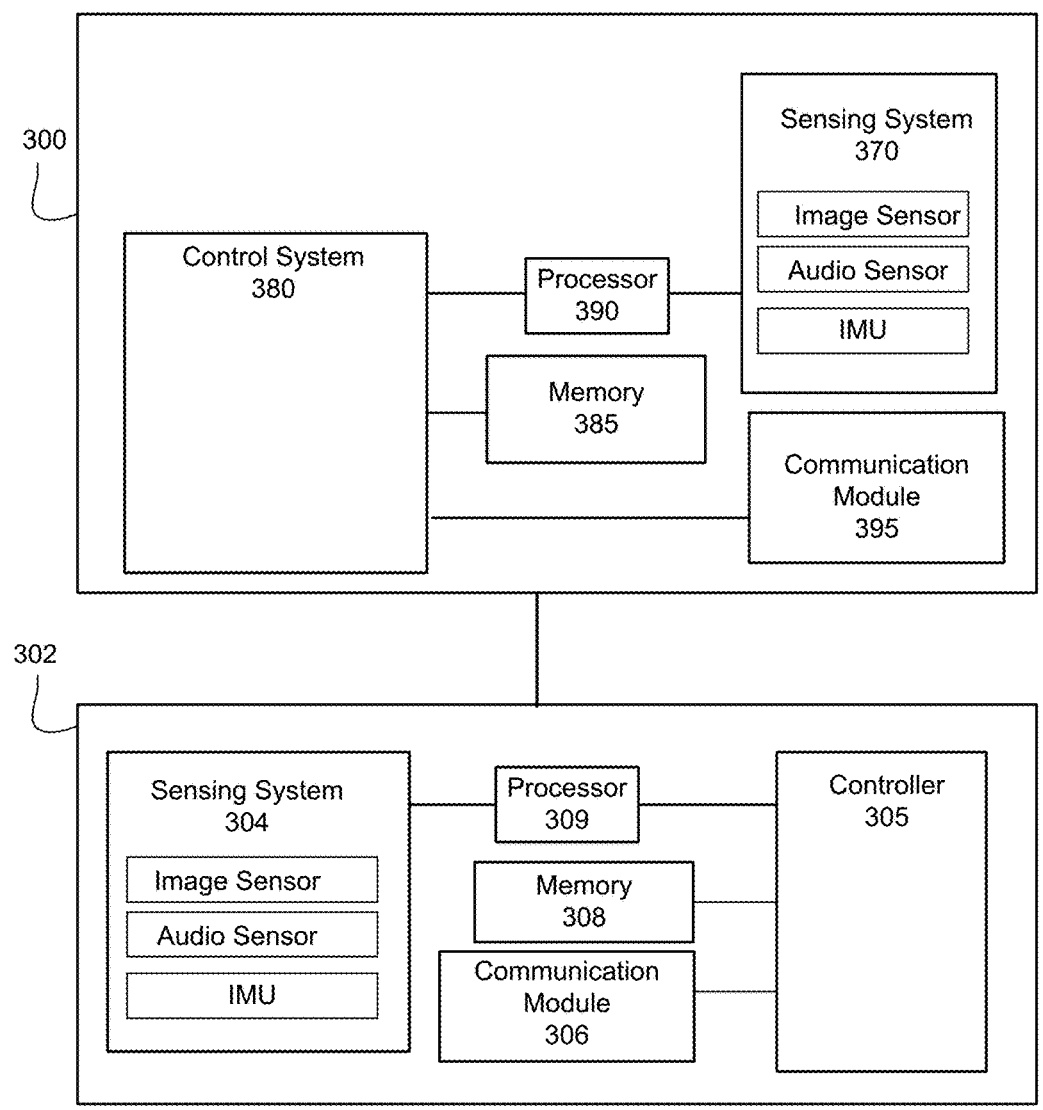
FIG. 3 is a block diagram of an augmented and/or virtual reality system, in accordance with implementations as described herein.

FIGS. 2A-2B are perspective views of the example HMD 100 worn by the user, and FIG. 3 is a block diagram of an example augmented/virtual reality system, in accordance with implementations described herein. FIGS. 2A-2B and 3 will be described in more detail following a description of various implementations of a system and method to be presented herein.

Hereinafter, implementations will be described in which virtual notation surfaces may be generated in response to detection of a set gesture, for example, a set gesture implemented outside of the HMD 100. These virtual notation surfaces, or hereinafter, simply, virtual surfaces, may be configured to be adjusted in size and/or shape and/or surface contour in response to various manipulations implemented by the user, for example, through user interaction with the virtual surfaces using external devices 200 such as handheld electronic devices. The virtual surfaces may be configured receive virtual annotations applied by the user through, for example, user interaction with the virtual surfaces via the external devices 200. The virtual annotations may include any type of markings applied to the virtual surfaces in the form of, for example, text, sketches, information pulled from other virtual notation surfaces, and other types of annotations as desired by the user.

FIGS. 4A-4E illustrate an example implementation, in which a virtual notation surface is generated in a virtual environment, in response to a detected user gesture. In this example, the user is immersed in the virtual environment generated by the HMD 100, with the HMD 100 being operably coupled with the external device(s) 200 including a pair of handheld electronic devices, or controllers, 200A and 200B, to exchange information related to user interactions with virtual objects, elements, features and the like in the virtual environment. As noted above, other types of external computing devices may be operably coupled with the HMD 100, instead of or in addition to the example controllers 200A and 200B.

Figure 4A:
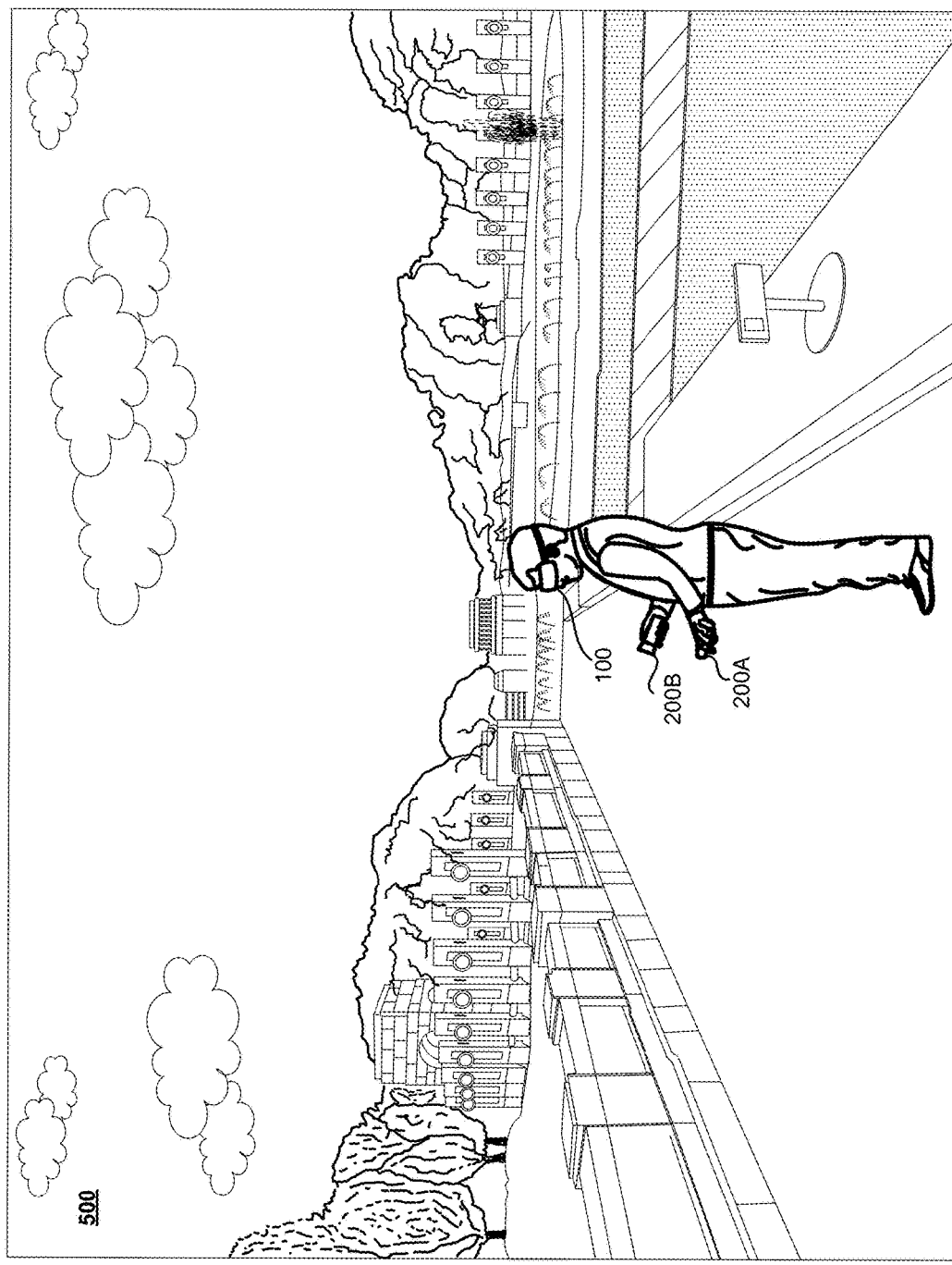

FIG. 4A illustrates a virtual scene 500, or virtual environment 500, viewed by the user, for example, on the display 140 of the HMD 100, with a representation of the user also illustrated, simply for ease of discussion and illustration. In this example, the user is wearing the HMD 100, and holding the first and second controllers 200A and 200B that are operably coupled to, or paired with, the HMD 100. While experiencing the virtual environment 500 illustrated in the example shown in FIG. 4A, the user may find it useful to, for example, make a note, for example, in a text form, or a sketch, or other manner, based on, for example, an observation made while experiencing the virtual environment 500, as a reminder for later reference, to record information to be shared with other users, and the like.

In some implementations, the virtual environment 500 may be displayed to the user substantially within the confines of the HMD 100, for example, on the display 140 of the HMD 100 as described above. In this situation, traditional methods for recording notes, messages sketches and the like using, for example, a marking implement on a writing surface (pen/pencil on paper, marker on a whiteboard, and the like) may not be practical, as they may require the user to interrupt the virtual experience and temporarily leave the virtual environment 500. In a system and method, in accordance with implementations described herein, the user may cause a virtual notation surface (or, hereinafter, simply a virtual surface, for ease of discussion) to be materialized in the virtual environment 500. The user may then annotate the virtual surface with, for example, text, sketches and the like, without leaving the virtual environment 500. The annotated virtual surfaces may be stored and accessible for reference later, by the user and/or by other users, in the same virtual environment 500, and/or in a different virtual environment, and/or outside the virtual environment. The annotated virtual surfaces, and/or notations recorded on the annotated virtual surfaces, may be combined onto a single virtual surface, and/or multiple virtual surfaces may be virtually connected or joined to form a composite virtual surface. The ability to store the annotated virtual surfaces, access the stored virtual surfaces at a later time, combine notations from different virtual surfaces and/or join multiple virtual surfaces, may somewhat mimic the process followed by collaborative users in the real world, improving user productivity and enhancing the virtual experience.

Figure 4B:
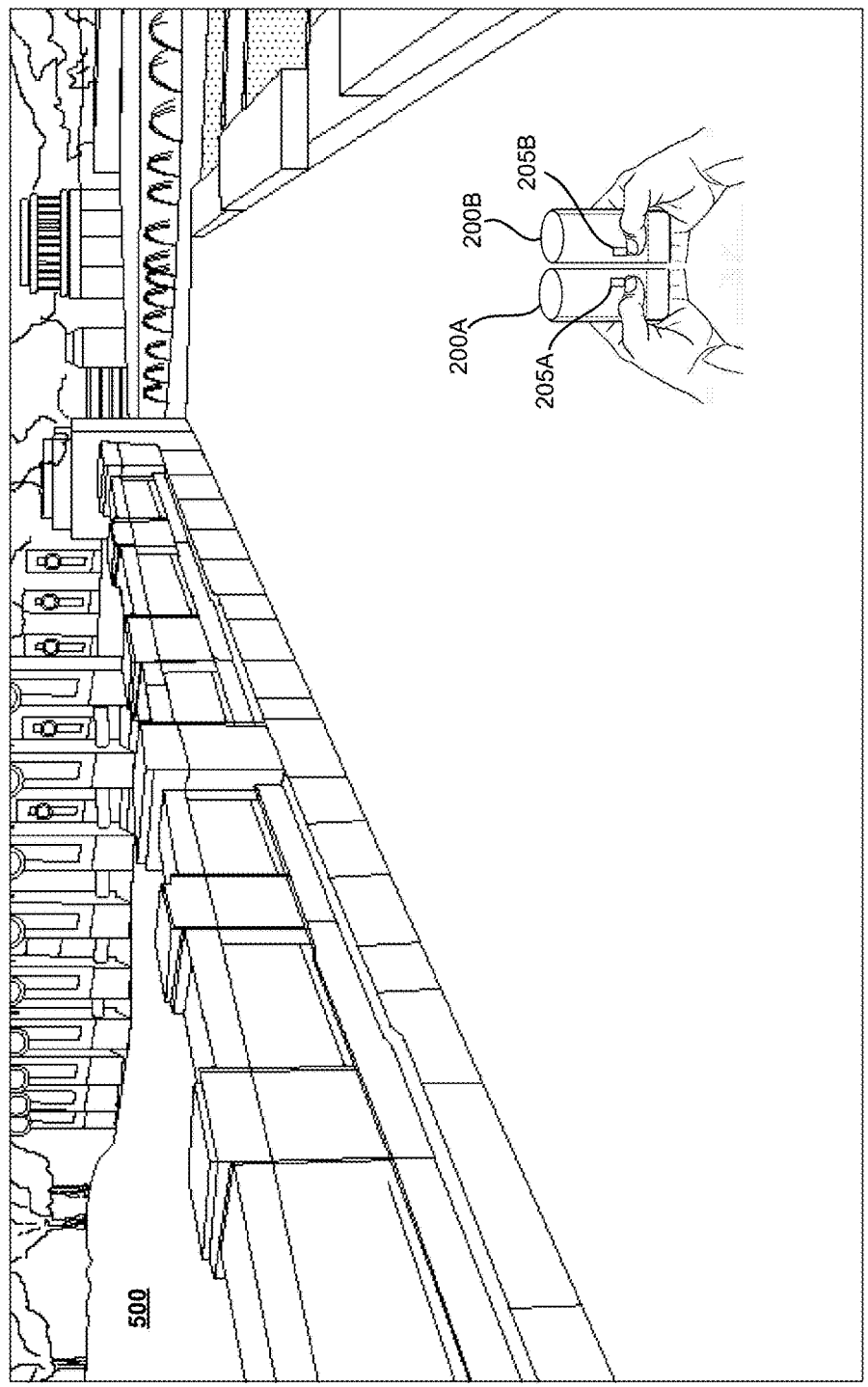

As shown in FIG. 4B, while immersed in the virtual environment 500, the user may implement a set gesture. The set gesture may be detected by the system, and may be recognized by the system as a gesture corresponding to a command to materialize a virtual surface 600. In the example shown in FIG. 4B, the user may bring the first and second controllers 200A and 200B into a first position in a set manner, in which the first and second controllers 200A and 200B are positioned in a set manner which may be detected by the system. In the example shown in FIG. 4B, the first and second controllers 200A and 200B are aligned in a set manner which may be detected by the system as the initiation of the set gesture. The first position shown in FIG. 4B is just one example a first position arrangement of the first and second controllers 200A and 200B. The set gesture, including the first position, may be set and detected based on other relative positions of the first and second controllers 200A and 200B, based on, for example, user preferences, factory settings and the like. With the first and second controllers 200A and 200B in the first position, the user may provide an input, such as, for example, actuation of a manipulation device 205A, 205B, such as a trigger or button, on one or both of the controllers 200A, 200B. Actuation of one, or both, manipulation devices 205A, 205B, with the first and second controllers 200A and 200B in this first gesture position, may be detected by the system as a user input command to generate the virtual surface 600. In some implementations, the relative positioning of the controllers 200A, 200B may be detected by position/orientation sensors in the controllers 200A, 200B, and/or by image sensor(s) in the HMD 100 and/or other components of the system, and/or a combination of data provided by sensor(s) in the controllers 200A, 200B and sensors in the HMD 100 and other components of the system that together provide for tracking of position and orientation of the first and second controllers 200A and 200B.

Figure 4C:
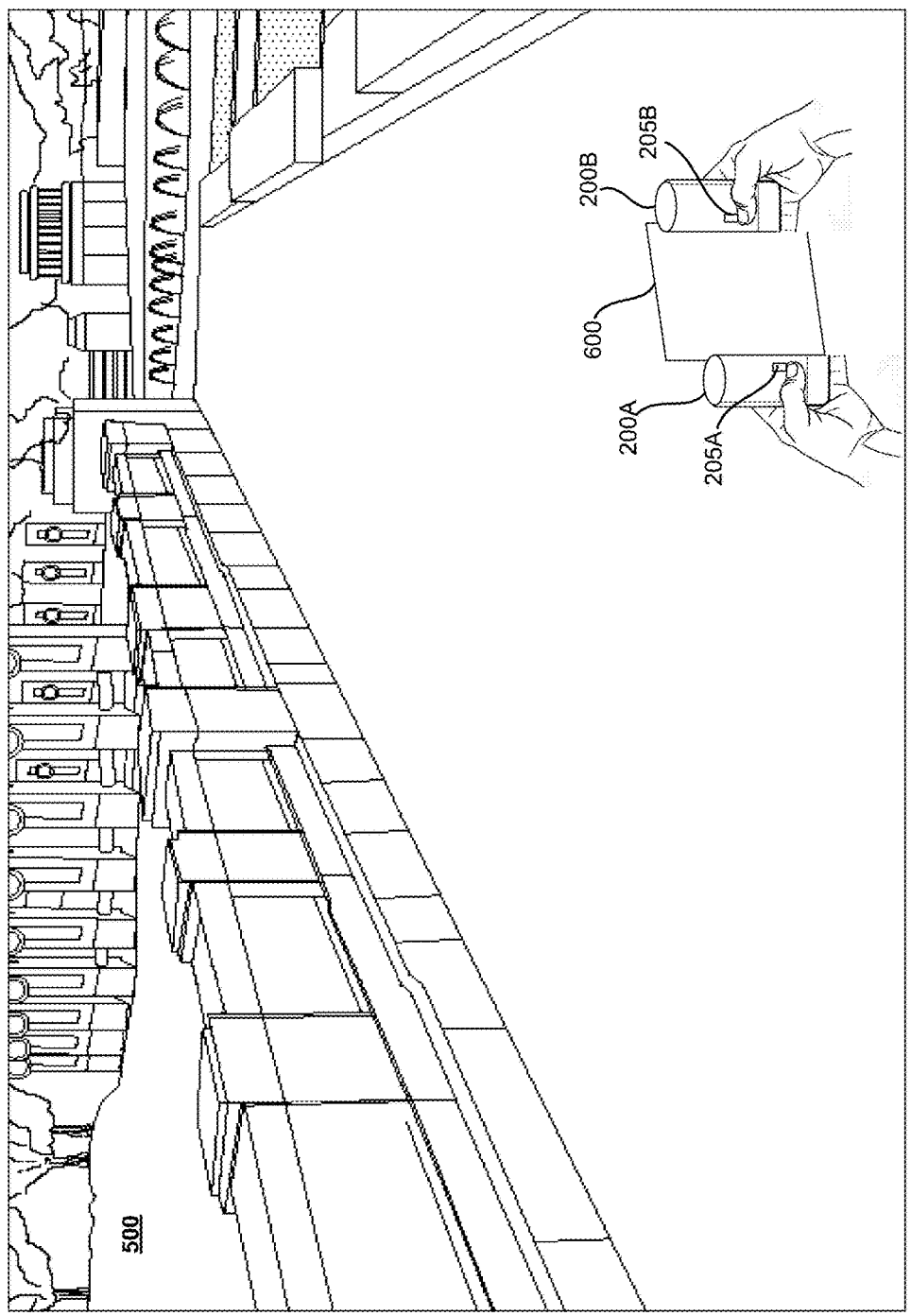
Figure 4D:
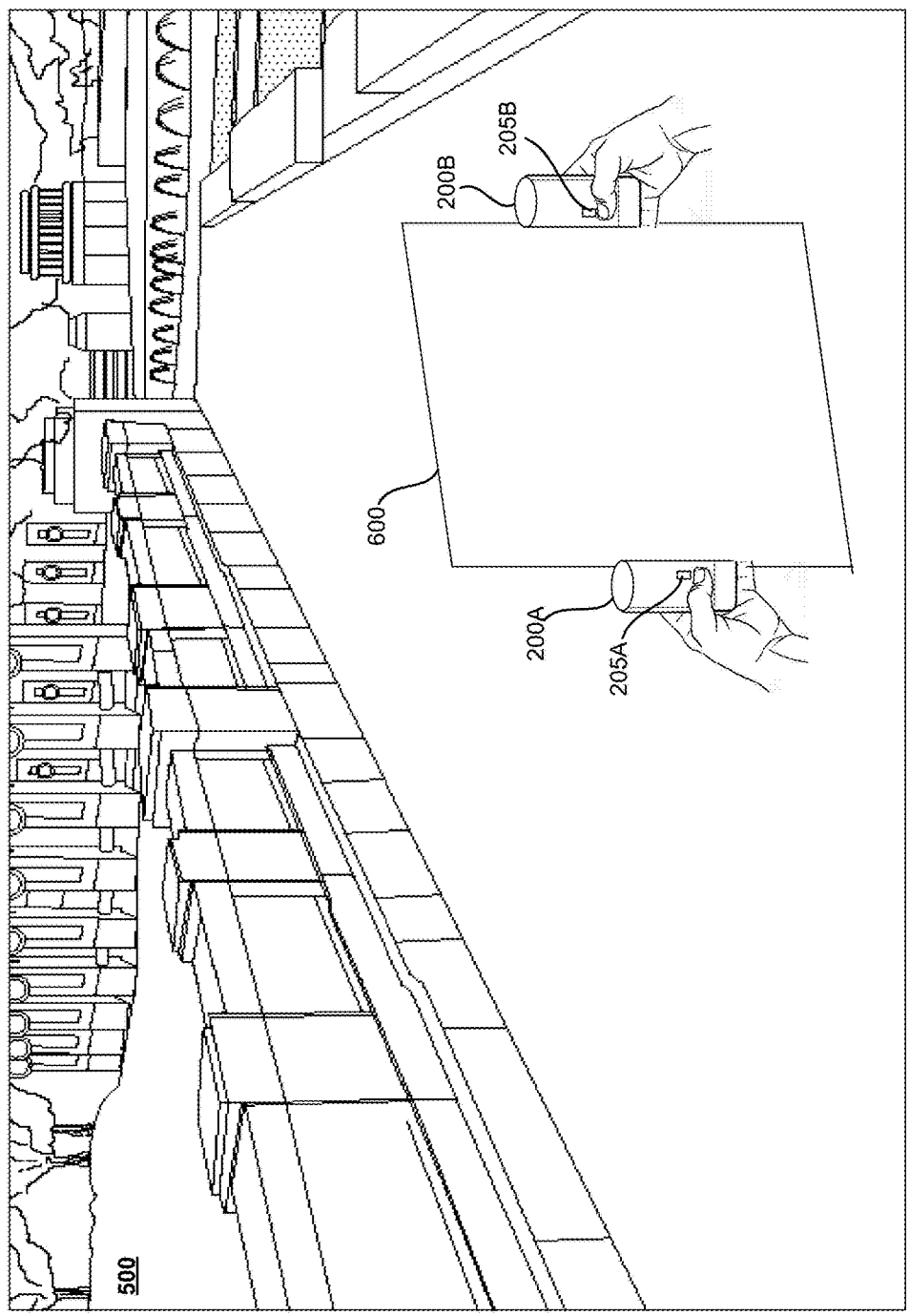

As the user moves the controllers 200A, 200B apart (or away from one another), the virtual surface 600 may materialize, and be adjusted in size as the user continues to move the controllers 200A, 200B, as shown in FIGS. 4C and 4D. In some implementations, the user may continue to maintain one or both manipulation devices 205A and/or 205B in an actuated state (by, for example, keeping a button or trigger in a depressed state) as the controllers 200A, 200B continue to move, indicating the user wishes to continue to adjust the size and/or shape of the virtual surface 600. Upon detecting that the user has completed the materialization of the virtual surface 600 to the desired size and/or shape, by, for example, detecting a release of the actuation of the manipulation device(s) 205A, 205B, the virtual surface 600 may be ready to receive user inputs in the form of text, sketches and the like, as shown in FIG. 4E. In this example, the size and/or shape of the virtual surface 600 may be determined by the system based on a second position of the first controller 200A and a second position of the second controller 200B at the point at which the release of the actuation of the manipulation device(s) 205A, 205B is detected.

Figure 4F:
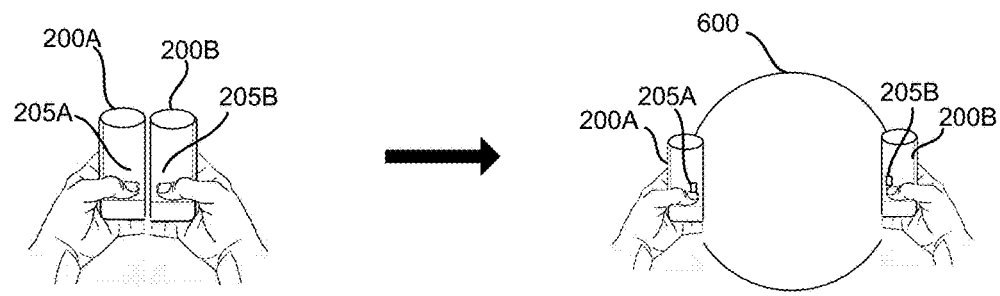
Figure 4G:
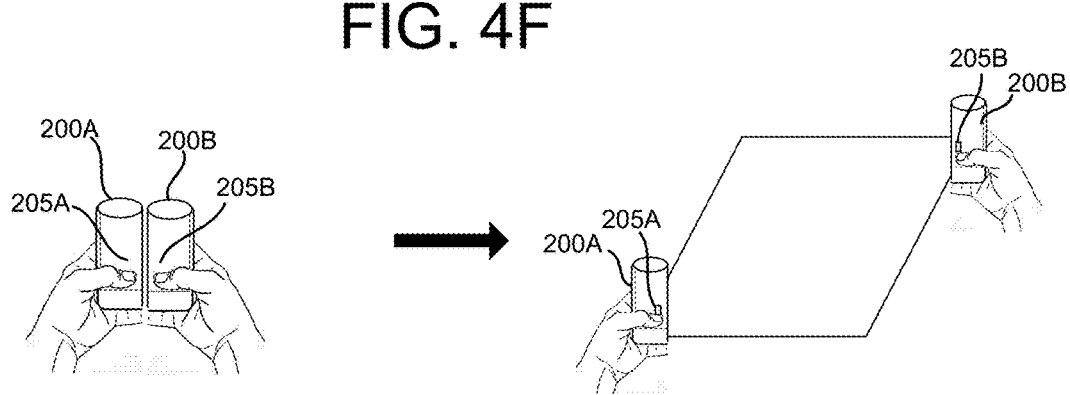
Figure 4H:
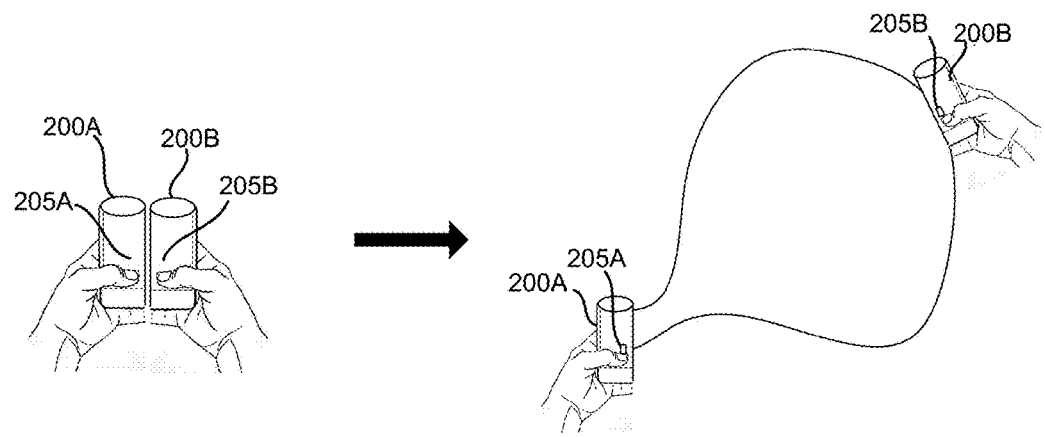

In the example shown in FIGS. 4A-4E, the virtual surface 600 is substantially rectangular. This is just one example of a peripheral shape of the virtual surface 600, simply for ease of discussion and illustration. The periphery of the virtual surface 600 may be defined by other shapes, and may be regular, such as, for example, circles, ovals, triangular, trapezoidal and the like, as shown, for example, in FIGS. 4F and 4G, and/or may be defined by an irregular periphery, as shown, for example, in FIG. 4H, and/or may be defined by a combination of different peripheries. In some implementations, the peripheral shape of the virtual surface 600 may be preset, based on, for example, user preferences or factory settings. In some implementations, the peripheral shape of the virtual surface 600 may be selected by the user when generating the virtual surface 600 such as, for example, with the controllers 200A and 200B at the first position. In some implementations, the peripheral shape of the virtual surface 600 may be manipulated, or changed, after the virtual surface 600 has been generated, for example, before annotation of the virtual surface 600, or after annotation of the virtual surface 600, or both before and after annotation of the virtual surface 600.

In the example shown in FIGS. 4A-4H, the surface contour of the virtual surface 600 is defined by a substantially flat plane, simply for ease of discussion and illustration. The surface contour of the virtual surface 600 may be defined by other contours, such as, for example, a curved contour, an angled, or folded contour, and the like, and/or or may be defined by irregular contours, and/or may be defined by a combination of different contours. In some implementations, the contour of the virtual surface 600 may be preset, based on, for example, user preferences or factory settings. In some implementations, the contour of the virtual surface 600 may be selected by the user when generating the virtual surface 600 such as, for example, with the controllers 200A and 200B at the first position. In some implementations, the contour of the virtual surface 600 may be manipulated, or changed, after the virtual surface 600 has been generated, for example, before annotation of the virtual surface 600, or after annotation of the virtual surface 600, or both before and after annotation of the virtual surface 600.

In some implementations, the user may annotate the virtual surface 600 using a marking implement such as, for example, one or both of the controllers 200A, 200B, a hand/finger whose position and orientation is tracked by the system, or other designated marking implement whose position and orientation is tracked by the system. For example, as shown in FIG. 5A, once the virtual surface 600 is materialized and ready to receive annotations, the system may detect movement of one of the controllers 200A, 200B, corresponding to annotations to be applied to the virtual surface 600. In some implementations, a particular initialization action, such as user actuation of one of the manipulation device(s) 205A, 205B of the respective controller 200A, 200B, such as, for example, depression of a button or trigger, may initialize respective the controller 200A, 200B for virtual marking and/or annotation of the virtual surface 600.

In the example shown in FIG. 5A, actuation of the manipulation device 205B of the second controller 200B may initialize the second controller 200B to begin annotation of the virtual surface 600. As shown in FIG. 5B, the user may move, or articulate the second controller 200B, while maintaining the manipulation device 205B in the actuated state, to define the annotation to be applied to the virtual surface 600 based on the movement of the second controller 200B. In some implementations, the annotation may be virtually displayed on the virtual surface 600 as the user moves the controller 200B in the desired pattern while maintaining the manipulation device 205B in the actuated state. In some implementations, the annotation may be virtually displayed on the virtual surface 600 after the actuation of the manipulation device 205B is released. The user may further annotate the currently displayed virtual surface 600 by again actuating or depressing the manipulating device 205B to initialize the controller 200B for annotation of the virtual surface 600, and then moving the controller 200B in the desired pattern or contour to further annotate the virtual surface 600 as desired, as shown in FIG. 5C. In the example shown in FIGS. 5B and 5C, the second controller 200B is actuated and moved to annotate the virtual surface 600. However, as noted above, annotation of the virtual surface 600 may also be done in response to actuation and movement of the first controller 200A, and/or by actuation and movement of both the first controller 200A and the second controller 200B, and/or by actuation and movement of another virtual marking implement, in addition to, or instead of, the first controller 200A and/or the second controller 200B.

Figure 5D:
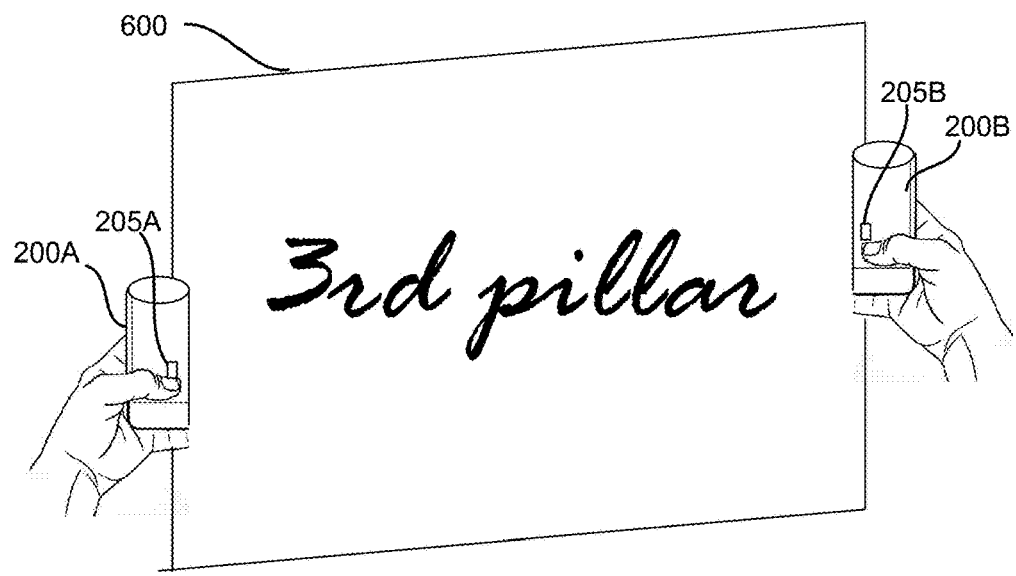
Figure 5E:
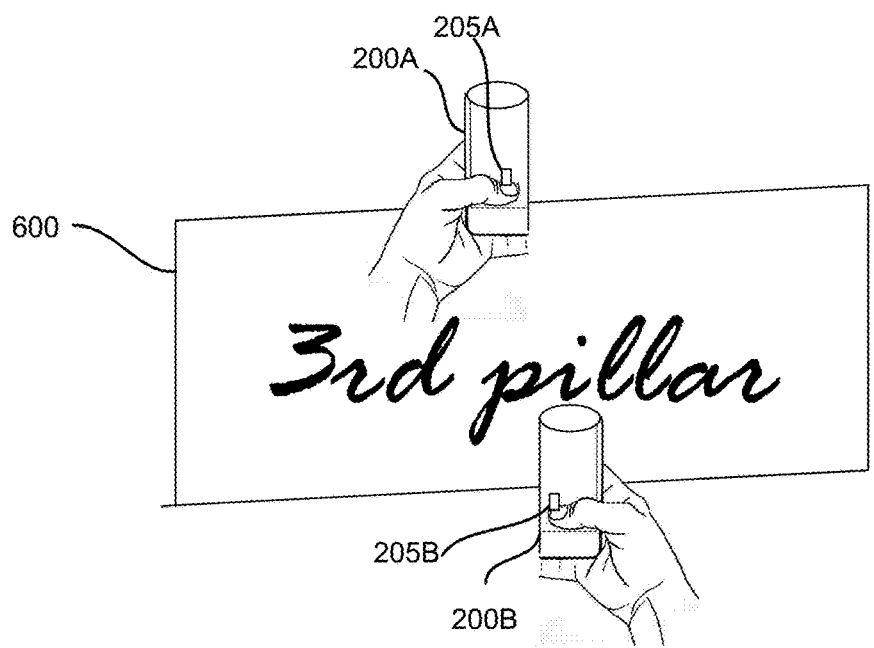

In some implementations, the user may want to adjust a size and/or a shape and/or an orientation of the virtual surface 600, either before or after the virtual surface 600 has been annotated in the manner described above. The size and/or shape of virtual surface 600 may be adjusted by, for example, further virtual manipulation of the virtual surface 600. For example, as shown in FIG. 5D, with the first controller 200A positioned at a left edge of the virtual surface 600 and the second controller 200B positioned at a right edge of the virtual surface 600, the user may actuate the manipulation device 205A of the first controller 200A and the manipulation device 205B of the second controller 200B, and move the left and right edges outward, from the arrangement shown in FIG. 5C to the arrangement shown in FIG. 5D. Similarly, as shown in FIG. 5E, with the first controller 200A positioned at a top edge of the virtual surface 600 and the second controller 200B positioned at a bottom edge of the virtual surface 600, the user may actuate the manipulation device 205A of the first controller 200A and the manipulation device 205B of the second controller 200B, and move the top and bottom edges toward each other, from the arrangement shown in FIGS. 5C and 5D to the arrangement shown in FIG. 5E. The user may adjust a position of just one of the edges of the virtual surface 600 in a similar manner, by actuating and moving one of the controllers 200A, 200B from a first position at an edge of the virtual surface 600 to a second position, to make a corresponding adjustment in size/shape of the virtual surface 600. The user may terminate this adjustment in size and/or shape by, for example, releasing the manipulation devices 205A, 205B.

As noted above, a peripheral shape of the example virtual surface 600 shown in FIGS. 5A-5E is rectangular, simply for ease of discussion and illustration. However, a size and/or a shape of a virtual surface 600 being defined by a different peripheral shape may be adjusted in a similar manner to what is described in FIGS. 5A-5E. For example, as shown in FIG. 5F, a virtual surface 600 defined by a substantially circular periphery may be adjusted, for example, increased, in size, and/or a shape thereof adjusted in response to relative movement of the first and second controllers 200A and 200B. In the example shown in FIG. 5G, a virtual surface 600 defined by an irregularly shaped periphery may be adjusted, for example, decreased in size, and/or a shape thereof adjusted in response to movement of the first and second controllers 200A and 200B.

In some implementations, the adjustment in size and/or shape of the virtual surface 600 may also cause a corresponding adjustment in size, or scale, of the annotation on the virtual surface 600. For example, as shown in FIG. 6A, with the first controller 200A positioned at a bottom corner of the virtual surface 600 and the second controller 200B positioned at an opposite top corner of the virtual surface 600, the user may actuate the manipulation device 205A of the first controller 200A and the manipulation device 205B of the second controller 200B, and may move the opposite bottom and top corners of the virtual surface 600 toward each other, to proportionally decrease a size and scale of the virtual surface 600 and the annotation received on the virtual surface 600, from the arrangement shown in FIG. 6A to the arrangement shown in FIG. 6B. An increase in size and/or scale of the virtual surface 600 and the annotation may be achieved by, for example, moving the opposite corners in a direction away from each other, for example, from the arrangement shown in FIG. 6B to the arrangement shown in FIG. 6A.

In some implementations, the orientation of the virtual surface 600 may be adjusted in response to relative movement of the first and second controllers 200A and 200B. In the example shown in FIG. 6C, relative movement of the first and second controllers 200A and 200B results in a rotation of the virtual surface 600 in the substantially vertical plane. In the example shown in FIG. 6D, relative movement of the controllers 200A and 200B results in a change in orientation of the virtual surface 600 from the substantially vertical plane to the substantially horizontal plane. Numerous other changes in orientation of the vertical surface 600 may be achieved in response to relative movement of the first and second controllers 200A and 200B. These changes in orientation of the virtual surface 600 may be achieved in this manner for virtual surfaces being defined by different peripheral shapes and/or having different surface contours.

Figure 7A:
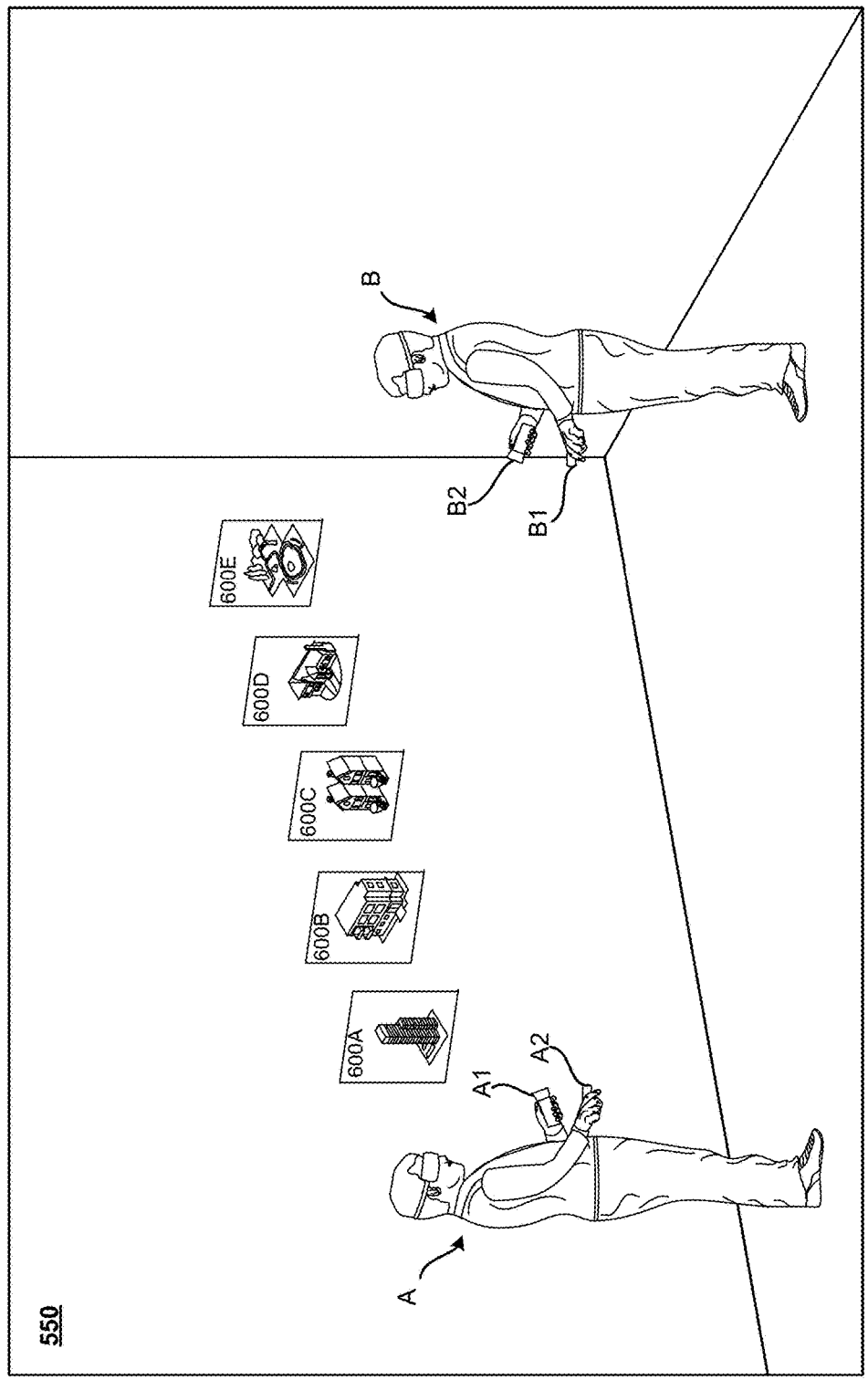

In some situations, it may be useful to have multiple virtual surfaces available for access and collaboration amongst multiple users. For example, a first user A in a first physical space and a second user B in a second physical space (or in the first physical space with the first user) may be immersed in a shared virtual environment 550, as shown in FIG. 7A. In the example shown in FIG. 7A, a representation of the first user A and a representation of the second user B are illustrated in the shared virtual space 550, simply for ease of discussion and illustration. In this example, the first user A is operating first and second controllers A1 and A2, and the second user is operating first and second controllers B1 and B2. Multiple virtual notation surfaces 600 (in particular, virtual surface 600A, 600B, 600C, 600D and 600E) may be available to the first user A and the second user B in the shared virtual environment 550, for access, review, revision, collaboration, and the like.

Figure 7B:
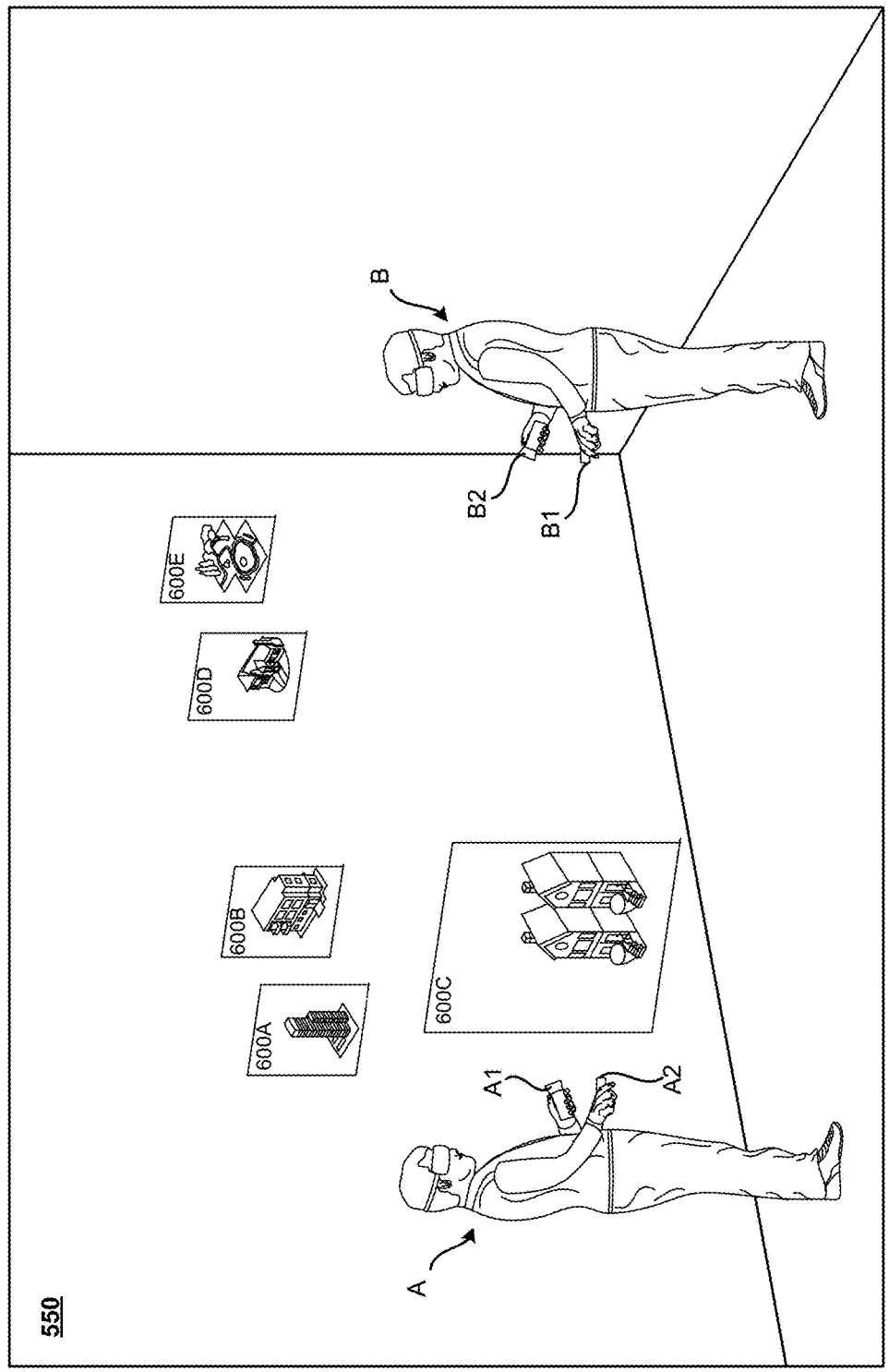
Figure 7C:
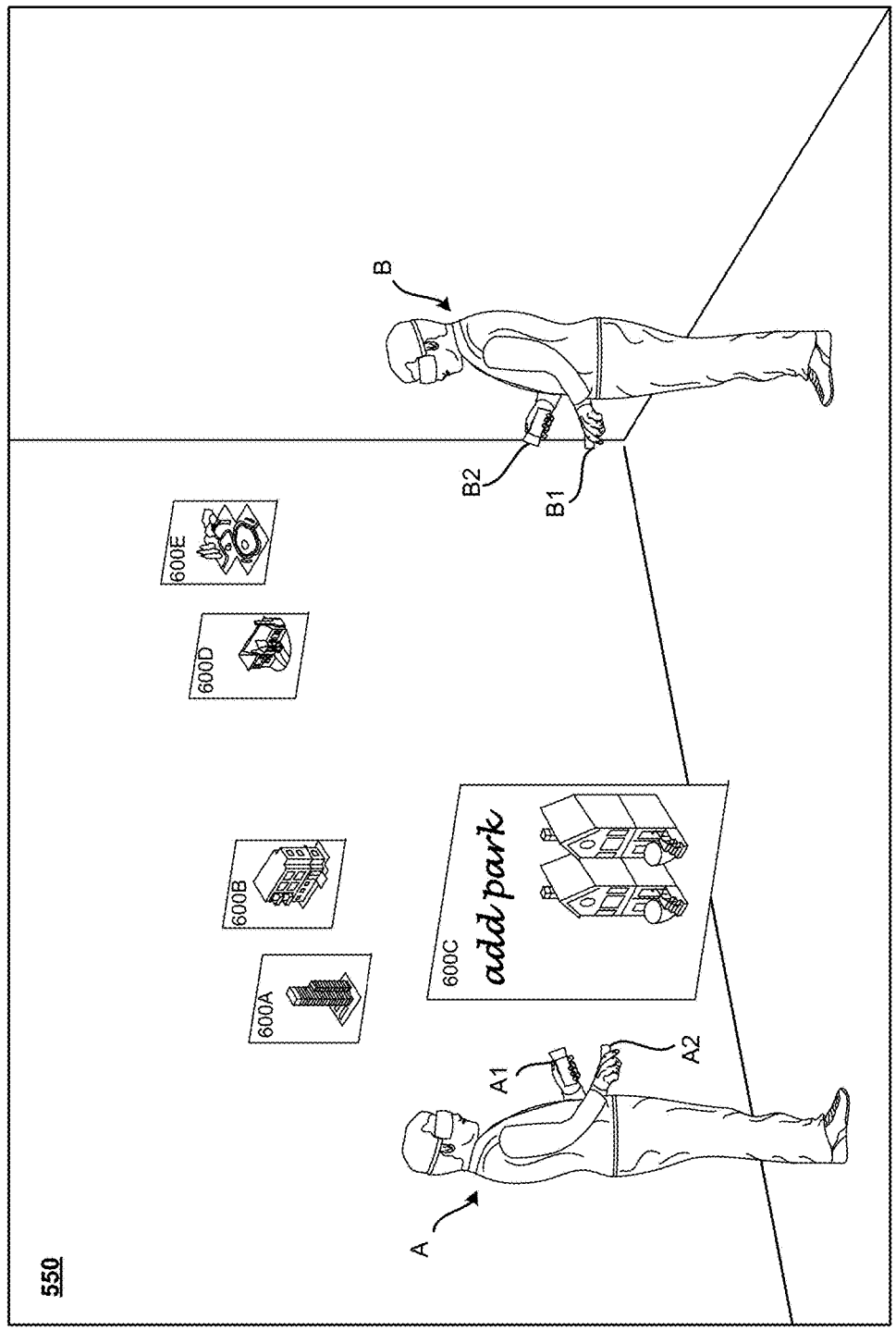

As shown in FIG. 7B, the first user A (or the second user B) may select one of the virtual surfaces 600, for example, the virtual surface 600C, for review by, for example, selecting the virtual surface 600C using one, or both, of the controllers A1, A2. In reviewing the selected virtual surface 600C, the first user A may, for example, enlarge the selected virtual surface 600C, for example, in the manner described above with respect to FIGS. 5D-5E and 6A-6B. The first user A may also add notes, sketches or other annotations to the virtual surface 600C, for example, in the manner described above with respect to FIGS. 5A-5C.

Figure 7D:
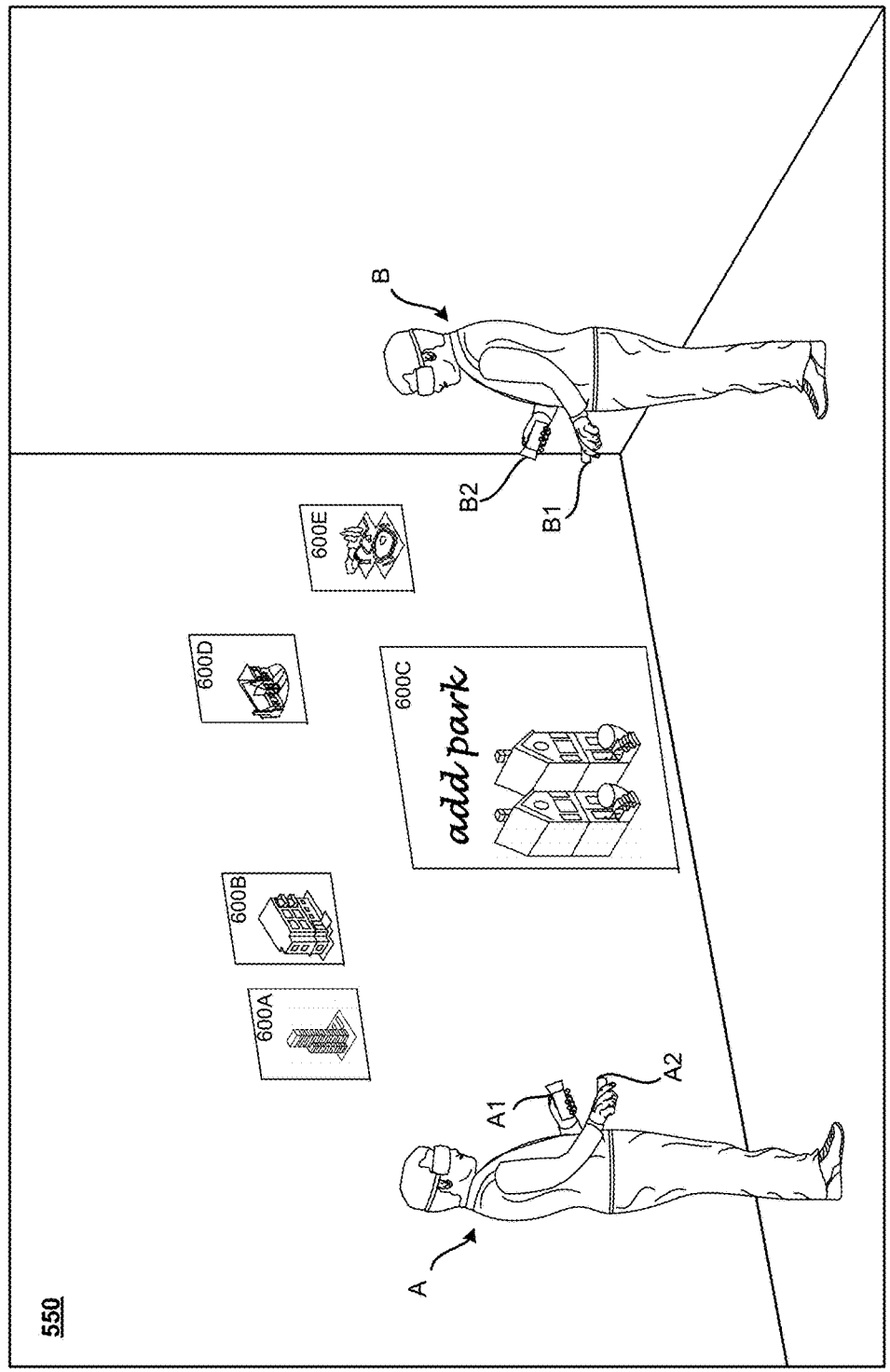
Figure 7F:
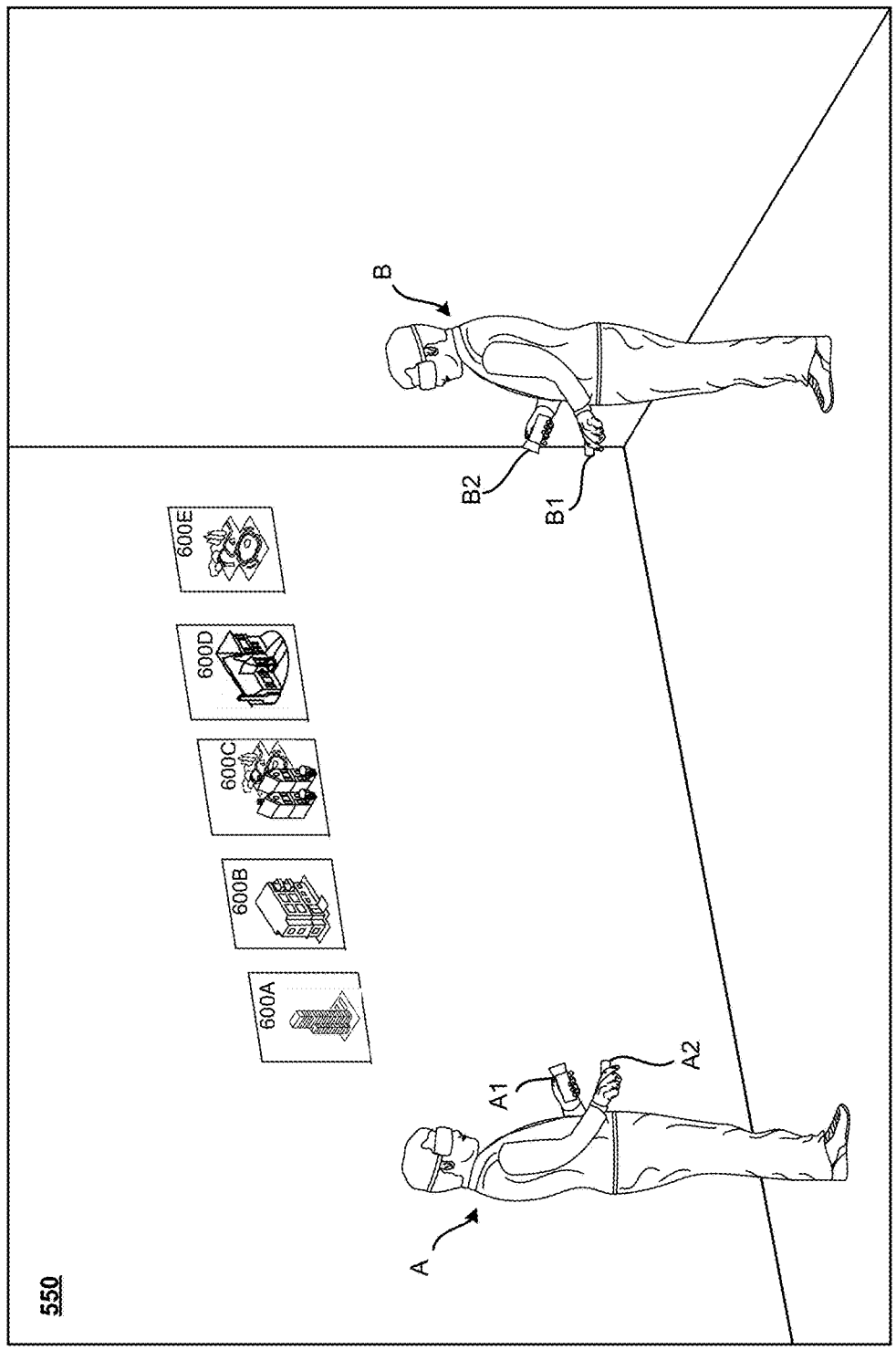

The second user B may view the virtual surface 600C, which has been annotated by the first user A, either substantially at the same time, in the shared virtual environment 550, or at a later time, and may further revise or otherwise annotate the virtual surface 600C. For example, in response to the note left by the first user A, suggesting the addition of a park, the second user B may also select the virtual surface 600E, including park information, as shown in FIG. 7D. The second user B may use the information stored on the virtual surface 600E to further annotate the virtual surface 600C, as shown in FIG. 7E. The further annotated virtual surface 600C may then be available for review by the first user A, either substantially real time in the shared virtual space 550, or at a later time by accessing the virtual surface 600C from storage as shown in FIG. 7F.

Virtual notation surfaces 600 may be materialized, and virtual notes and/or annotations and/or sketches may be made, adjusted and stored on the virtual surfaces 600 in the manner described above with respect to FIGS. 4A-4H, 5A-5G, 6A-6D, and 7A-7F, that are not necessarily related to the virtual environment currently being experienced. Virtual annotations stored on the virtual surface 600 may be stored so that they may also be accessible to the user and/or to other users for collaboration, outside of the current virtual environment 500, and/or in other virtual environments, and/or when not immersed in a virtual environment.

In some situations, virtual objects or features, such as, for example, the virtual surfaces 600 and/or objects to be added onto the virtual surfaces 600 may be outside of the virtual reach of the user in the virtual space 550. Similarly, in some situations, the user may wish to move virtual object or features, such as, for example, the virtual surfaces 600 and/or other virtual objects, from the relatively near field to a virtual position further from the user to, for example, clear the near field virtual space for other tasks. In some implementations, this movement of a virtual object, from a relatively far field position in the virtual space 500 to a relatively near field position in the virtual space 500, and/or from a relatively near field position to a relatively far field position in the virtual space 500, may be accomplished in response to detection of a gesture corresponding to a movement to be executed.

Figure 7G:
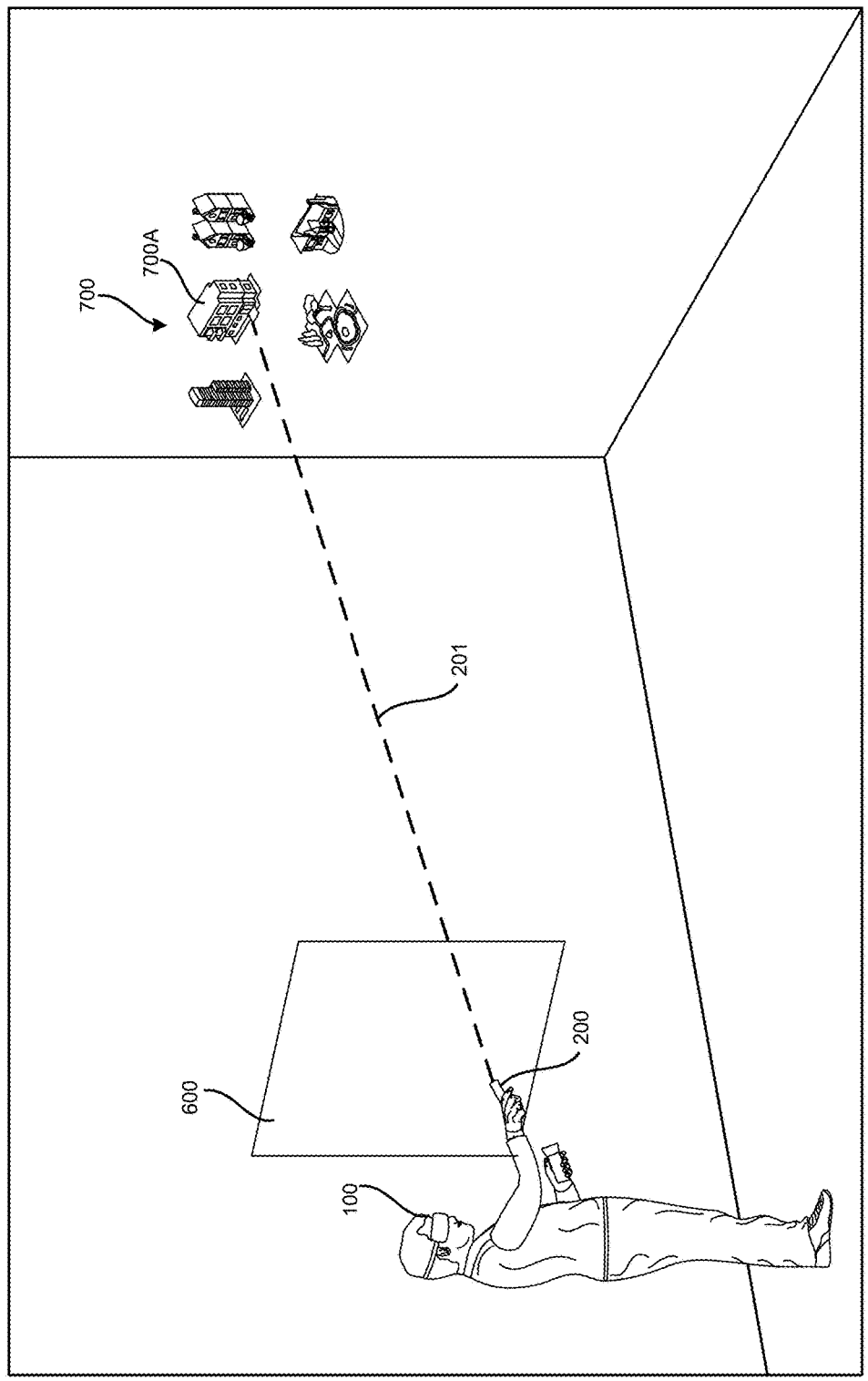

FIG. 7G is a third person view of the user in the physical space, interacting with the virtual environment and virtual objects generated by the HMD 100, and displayed to the user within the HMD 100, as described above. In the example shown in FIG. 7G, the user has caused the virtual surface 600 to be generated in the virtual environment, for example in the manner described above, and a plurality of virtual objects 700 are displayed to the user in the virtual far field. In addition to, or instead of, directly marking on, or drawing on, or writing on, the virtual surface, the user may choose to annotate, or draw on, or mark, or otherwise add to the virtual surface 600 by, for example, selecting one or more of the virtual objects 700 to be added to, or included on, the virtual surface 600.

As described above, the virtual objects 700 are in the far virtual field, and outside of the virtual reach of the user. To select one of the virtual objects 700 for annotation, or drawing, on the virtual surface 600, the user may select the virtual object 700 by, for example, orienting the handheld electronic device 200 toward a particular virtual object 700A to be selected. In the example shown in FIG. 7G, a virtual beam 201 is illustrated, directed from the handheld electronic device 200 toward the virtual object 700A, to provide a virtual visual indication to the user that the orientation of the handheld electronic device 200 is targeted at a virtual intersection with the virtual object 700A. In some implementations, this may be indicated to the user in other manners, such as, for example, a cursor or dot indicating the target of the orientation of the handheld electronic device 200, a highlighting or other change in appearance of the targeted virtual object, and the like. Selection of the virtual object 700A may be detected based on, for example, actuation of a manipulation device of the handheld electronic device 200, a dwell time on the virtual object 700A that is greater than or equal to a preset threshold dwell time, and the like.

Upon detection that the virtual object 700A has been selected, the user may implement a gesture indicating a desired movement of the selected virtual object 700A. For example, the user implement a rotating or twisting gesture, as shown in FIG. 7H, to draw the selected virtual object 700A closer to the user, for example, from the far virtual field toward the near virtual field, so that the user may interact with the selected virtual object 700A. In the example shown in FIG. 7H, the user implements a counterclockwise gesture to draw the selected virtual object 700A closer, simply for ease of discussion and illustration. However, the implemented gesture causing the selected virtual object 700A to be drawn closer to the user may be, for example, a clockwise movement or gesture, or a movement or gesture of the user's arm and/or hand, holding the handheld electronic device 200, closer to the user, or other such gestures and/or movements.

Figure 7I:
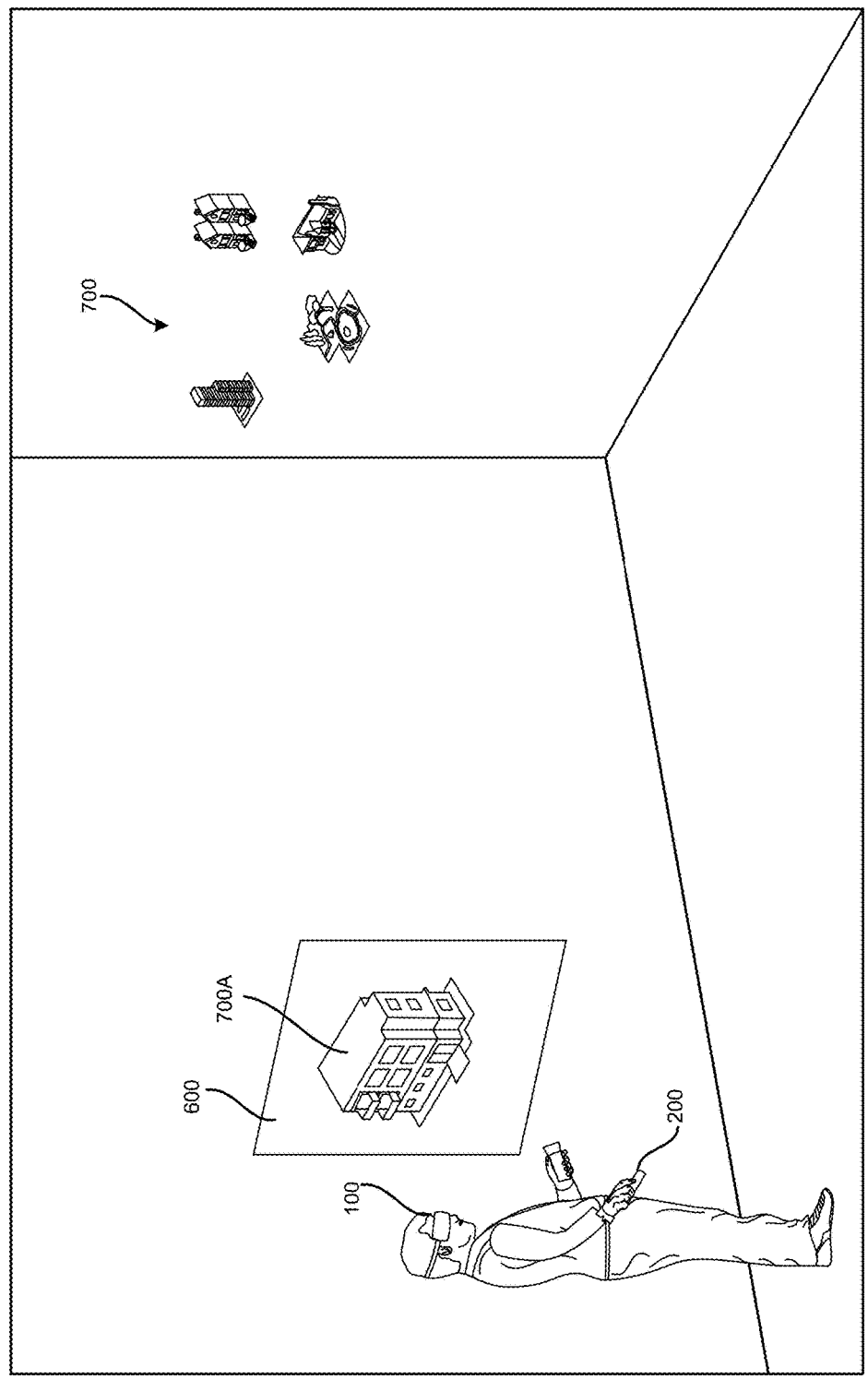

The user may sustain the gesture, for example, the rotated position of the user's arm/hand and handheld electronic device 200, for example, with the manipulation device of the handheld electronic device 200 in the actuated position, until the selected virtual object 700A is in a virtual position or location desired by the user. The user may implement other, additional gestures to, for example, move the selected virtual object 700A vertically and/or laterally, and the like. In the example shown in FIG. 7I, the user has moved the selected virtual object from the far virtual field into the near virtual field, and has moved the selected virtual object 700A laterally, so as to annotate the virtual surface 600 with the selected virtual object 700A. The virtual surface 600 may be further annotated, as described above, with additional figures, objects, text and the like, and/or may be adjusted in size and/or shape and/or contour as described above, by the user shown in FIG. 7I, and/or by another user in a collaborative effort as described above.

Figure 7J:
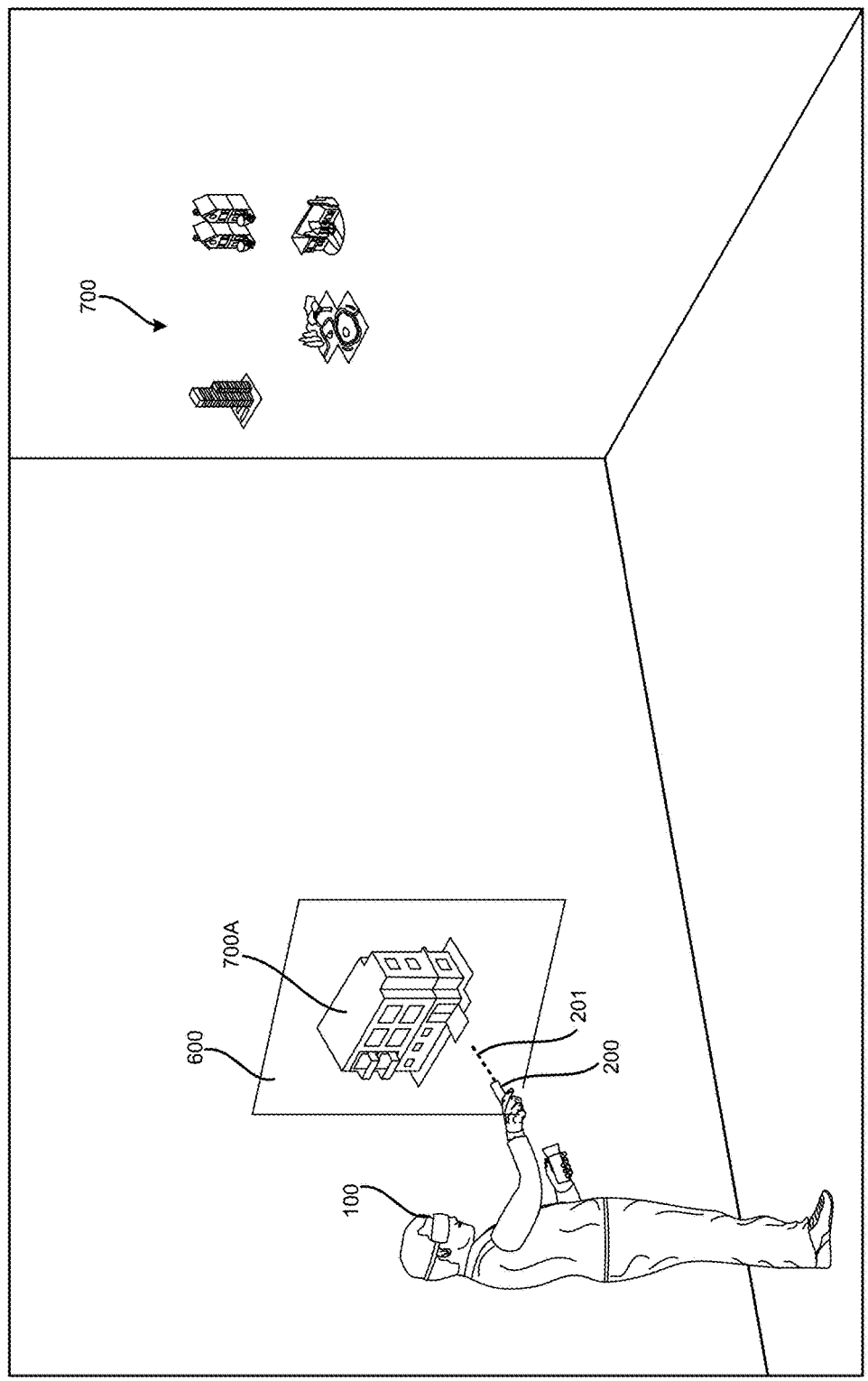
Figure 7K:
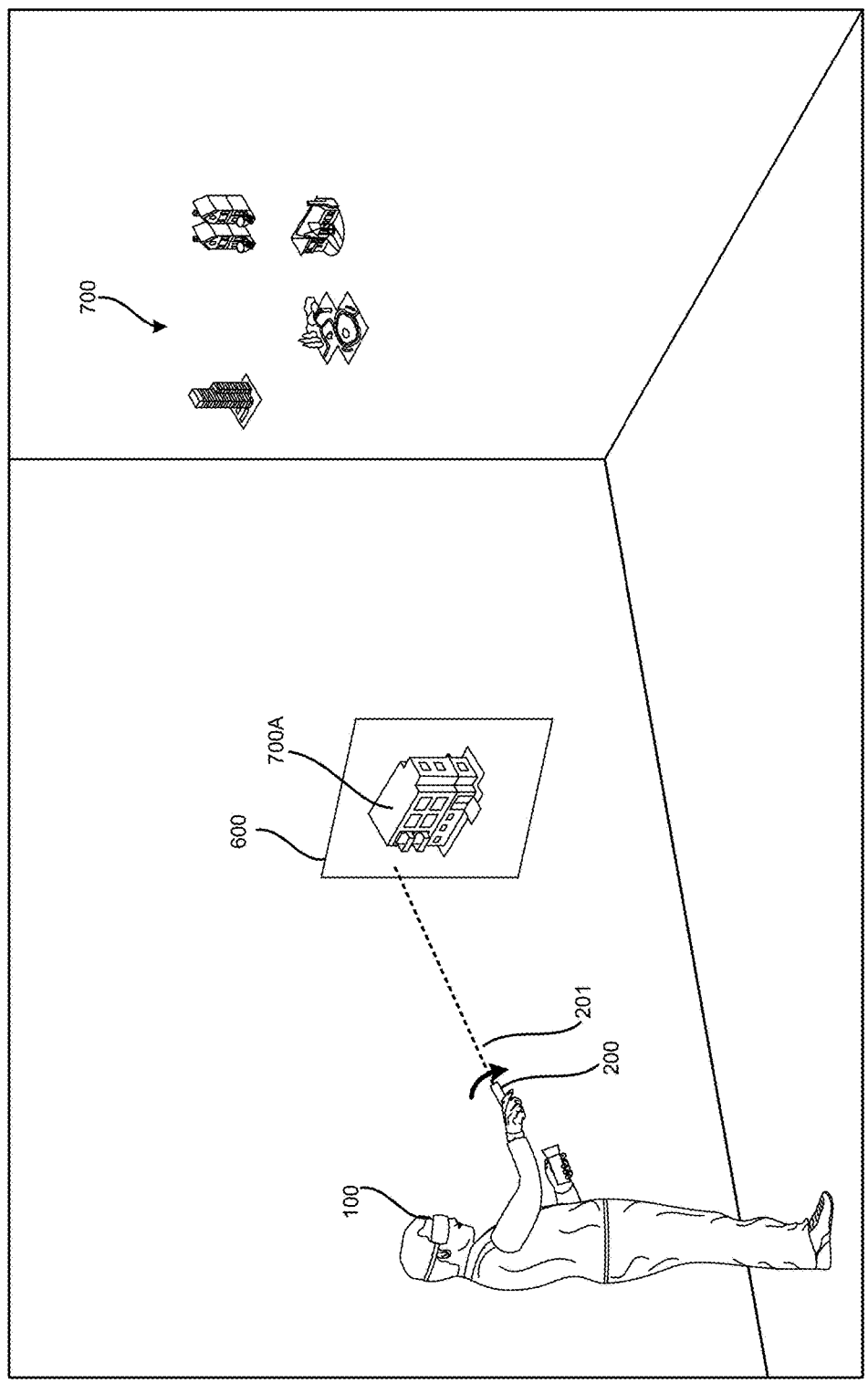
Figure 7L:
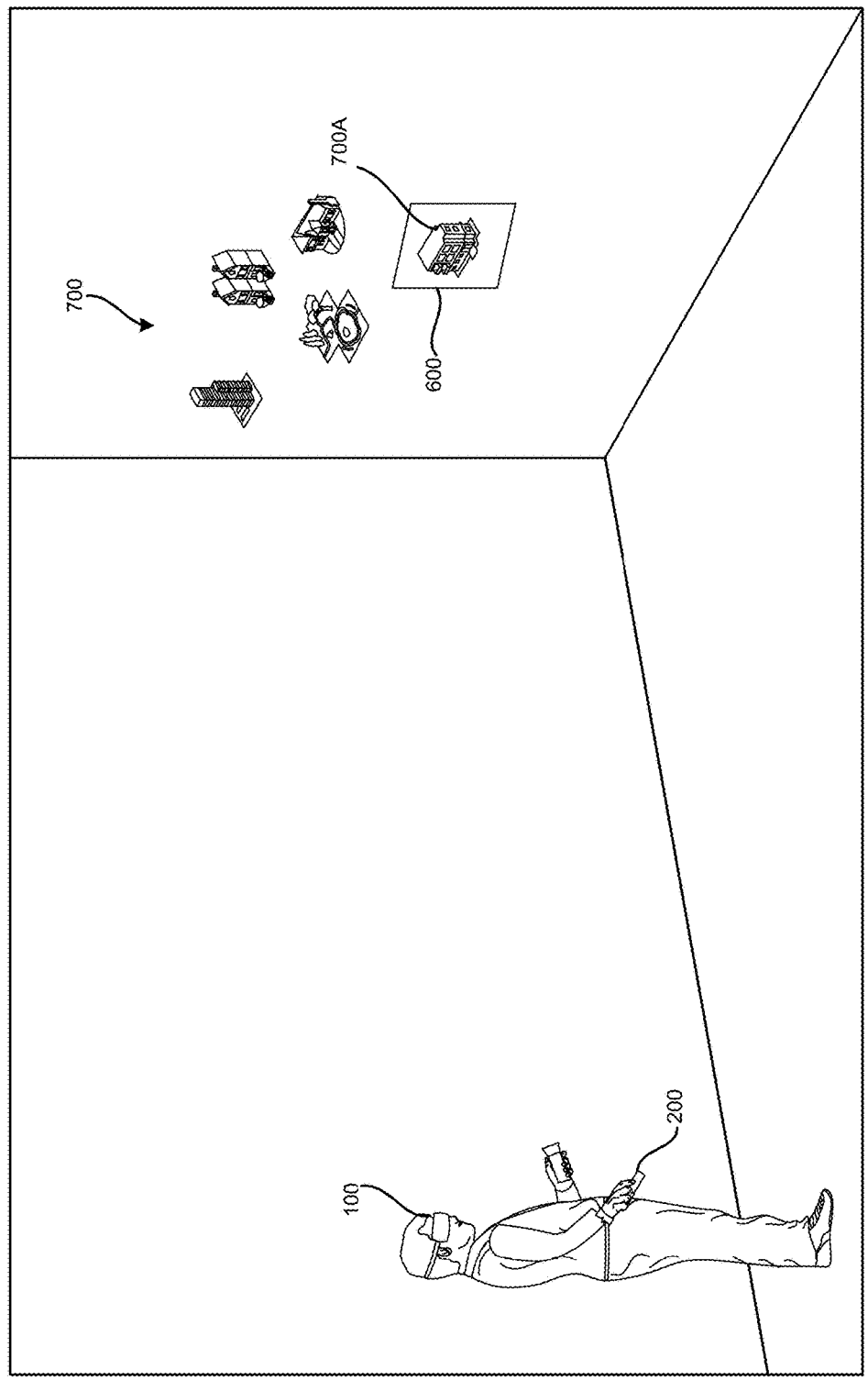

Virtual objects may be moved, for example, from the relatively near field to the relatively far field, in a similar manner. For example, after annotation of the virtual surface 600, the user may wish to move the annotated virtual surface 600 to clear space in the near virtual field for a new task. The user may select the annotated virtual surface 600, the virtual surface 600 representing the selected virtual object in the virtual environment, as shown in FIG. 7J, for example, in the manner described above. Upon detection that the virtual surface 600 has been selected, the user may implement a gesture indicating a desired movement of the selected virtual surface 600. For example, the user implement a rotating or twisting gesture, as shown in FIG. 7K, to move the selected virtual surface 600 away from the user, from the near virtual field toward the far virtual field. In the example shown in FIG. 7K, the user implements a clockwise gesture to move the selected virtual surface 600 away from the user, simply for ease of discussion and illustration. However, the implemented gesture causing the selected virtual surface 600 to be moved further from the user may be, for example, a counterclockwise movement or gesture, or a movement or gesture of the user's arm and/or hand, holding the handheld electronic device 200, in a direction away from the user, or other such gestures and/or movements. The user may sustain the gesture, for example, the rotated position of the user's arm/hand and handheld electronic device 200, for example, with the manipulation device of the handheld electronic device 200 in the actuated position, until the selected virtual surface 600 is in a virtual position or location desired by the user, as shown in FIG. 7L. The user may implement other, additional gestures to, for example, move the selected virtual surface 600 vertically and/or laterally, and the like.

Figure 8:
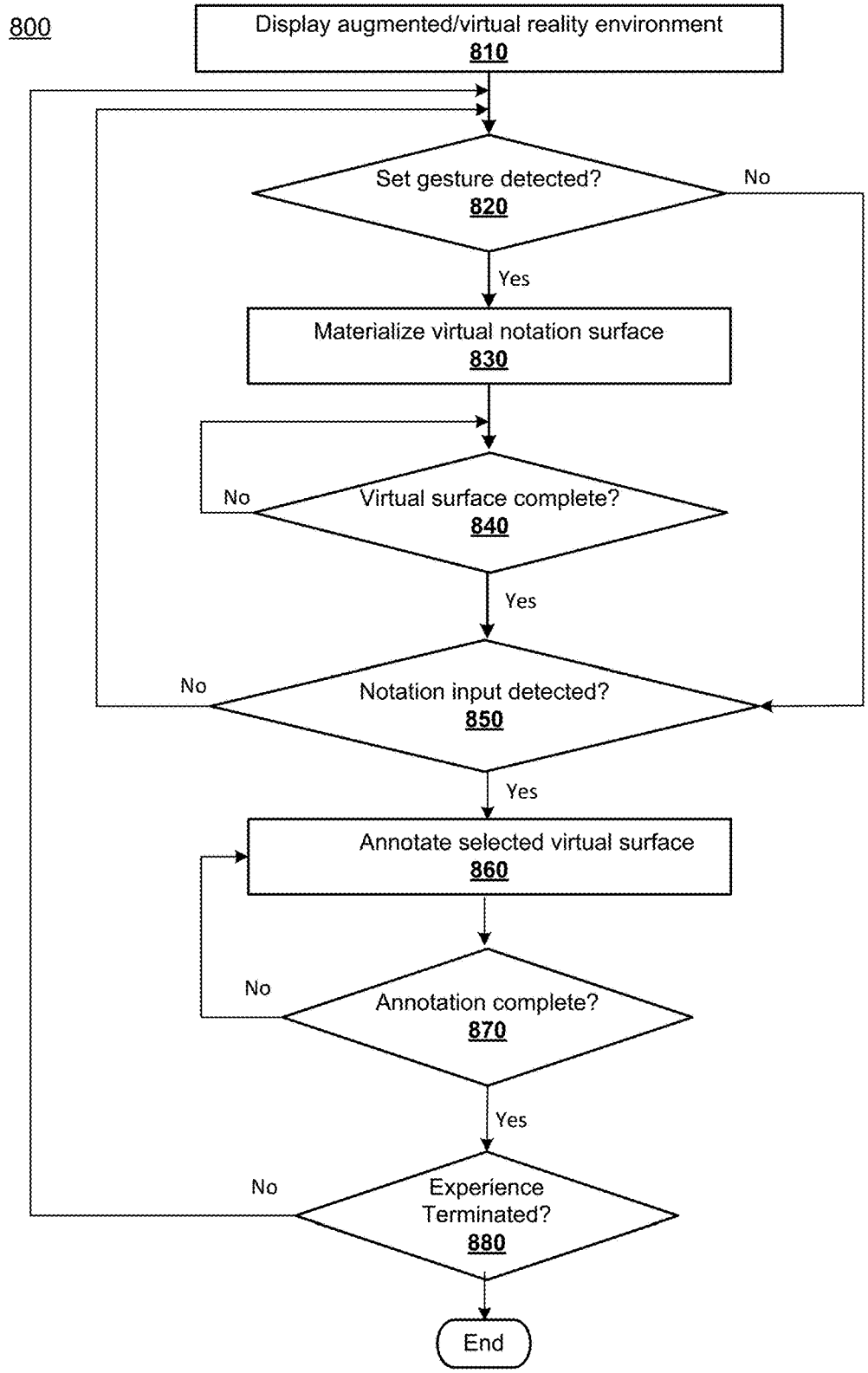
FIG. 8 is a flowchart of a method of materializing virtual notation surfaces in an augmented and/or virtual reality environment, in accordance with implementations as described herein.

A method 800 of materializing a virtual annotation surface in an augmented and/or virtual reality environment, in accordance with implementations as described herein, is shown in FIG. 8.

A user may initiate an augmented reality experience and/or a virtual reality experience using, for example, a computing device such as, for example, a system including a head mounted display device as described above, operably coupled with, or paired with, one or more external devices, to generate the augmented reality and/or virtual reality environment (block 810). The system may detect a set user gesture corresponding to a user input command to materialize a virtual notation surface (block 820), and may materialize a virtual notation surface in response to the detected set user gesture (block 830). As described with respect to FIGS. 4A-4C, the detected gesture may be, for example, a gesture implemented through movement and/or positioning of one or more external devices, or controllers, operably coupled with the head mounted display device, and may also include actuation of a manipulation device of the one or more external devices. The system may detect that materialization of the virtual notation surface is complete (block 840), for example, in response to a detected release of the manipulation device(s) of the external device(s), or controller(s), as discussed above with respect to FIGS. 4C-4H. The system may detect a user notation input (block 850), and annotate a selected virtual notation surface in response to the detected user notation input (block 860), until the system detects that notation of the selected virtual notation surface is complete (block 870). The detected user notation may correspond to, for example, a detected actuation of the manipulation device(s) of the external device(s), or controller(s), and movement of the external device(s), or controller(s), as described above with respect to FIGS. 5A-5C, 6A-6D, and 7A-7L. System detection of completion of the notation may include detection of a release of the actuation of the manipulation device(s). The process may continue until it is determined that the current augmented reality and/or virtual reality experience has been terminated (block 880).

In a system and method, in accordance with implementations described herein, virtual annotation surfaces, or virtual sheets, or virtual whiteboards, may be materialized in an augmented and/or virtual reality environment in response to a detected gesture. A user may annotate, adjust, store, review and revise the virtual annotation surfaces, and allow for collaboration with other users, while in the current virtual environment, and/or within another virtual environment, and/or outside of the virtual environment.

FIGS. 2A and 2B are perspective views of an example HMD, such as, for example, the HMD 100 worn by the user in the example shown in FIG. 1. The HMD 100 may include a housing 110 coupled to a frame 120, with an audio output device 130 including, for example, speakers mounted in headphones, also coupled to the frame 120. In FIG. 2B, a front portion 110*a* of the housing 110 is rotated away from a base portion 110*b* of the housing 110 so that some of the components received in the housing 110 are visible. A display 140 may be mounted on an interior facing side of the front portion 110*a* of the housing 110. Lenses 150 may be mounted in the housing 110, between the user's eyes and the display 140 when the front portion 110*a* is in the closed position against the base portion 110*b* of the housing 110. The HMD 100 may include a sensing system 160 including various sensors and a control system 170 including a processor 190 and various control system devices to facilitate operation of the HMD 100. For example, in some implementations, the sensing system 160 may include an inertial measurement unit (IMU) 162 including various different types of sensors such as, for example, an accelerometer, a gyroscope, a magnetometer, and the like. A position and orientation of the HMD 100 may be detected and tracked based on data provided by the IMU 162, allowing the system to in turn, detect and track the user's head gaze direction and movement. A camera 180 may capture still and/or moving images that may be used to help track a physical position of the user and/or other external devices in communication with/operably coupled with the HMD 100. The captured images may also be displayed to the user on the display 140 in a pass through mode.

In some implementations, the HMD 100 may include a gaze tracking device 165 including, for example, one or more sensors, to detect and track eye gaze direction and movement. Images captured by the sensor(s) 165A may be processed to detect and track direction and movement of the user's eye gaze, and the detected and tracked eye gaze may be processed as a user input to be translated into a corresponding interaction in the immersive virtual experience.

A block diagram of a system, in accordance with implementations described herein, is shown in FIG. 3. The system may include a first electronic device 300 (such as, for example, an HMD as described above with respect to FIGS. 1 and 2A-2B), and at least one second electronic device 302 (such as, for example, a handheld electronic device as described above with respect to FIG. 1, or other external device) in communication with the first electronic device 300. As noted above, although a single second electronic device 302 is shown in FIG. 3, simply for ease of discussion and illustration, more than one second electronic device 302 may be operably coupled with the first electronic device 300.

The first electronic device 300 may include a sensing system 360 and a control system 370, which may be similar to the sensing system 160 and the control system 170, respectively, shown in FIGS. 2A and 2B. The sensing system 360 may include different types of sensors, including, for example, a light sensor, an audio sensor, an image sensor, a distance/proximity sensor, and IMU, and/or other sensors and/or different combination(s) of sensors. The control system 370 may include, for example, a power/pause control device, audio and video control devices, an optical control device, a transition control device, and/or other such devices and/or different combination(s) of devices. The sensing system 360 and/or the control system 370 may include more, or fewer, devices, depending on a particular implementation. The elements included in the sensing system 360 and/or the control system 370 may have a different physical arrangement (e.g., different physical location) within, for example, an HMD other than the HMD 100 shown in FIGS. 2A and 2B. The first electronic device 300 may also include a processor 390 in communication with the sensing system 360 and the control system 370. The processor 390 may process inputs received from the sensing system 360, and execute instructions corresponding to the detected inputs. The first electronic device 300 may also include a memory 380, and a communication module 350 providing for communication between the first electronic device 300 and another, external device, such as, for example, the second electronic device 302. The processor 390 may also process inputs received from the second electronic device 302.

The second electronic device 302 may include a communication module 306 providing for communication and data exchange between the second electronic device 302 and another device, external to the second electronic device 302, such as, for example, the first electronic device 300. In some implementations, depending on a particular configuration of the second electronic device 302 (i.e., a handheld electronic device or controller, versus a keyboard or a mouse), the second electronic device 302 may include a sensing system 304 including, for example, an image sensor and an audio sensor, such as is included in, for example, a camera and microphone, an IMU, a touch sensor such as is included in a touch sensitive surface of a handheld electronic device, or smartphone, and other such sensors and/or different combination(s) of sensors. A processor 309 may be in communication with the sensing system 304 and a controller 305 of the second electronic device 302, the controller 305 having access to a memory 308 and controlling overall operation of the second electronic device 302.

As noted above, when immersed in the virtual reality environment generated by the HMD 100, the ability to make a note or sketch without having to leave the virtual environment, and to save that note or sketch for later reference and/or share that note or sketch with another user, may enhance the user's experience in the virtual environment. The ability to make this note or sketch without leaving the virtual environment may allow the user to remain connected, or present, in the virtual environment, without disruption and/or interruption of the virtual experience, whether or not the note or sketch, or other information to be recorded on the virtual notation surface, is related to the virtual environment being experienced. This may provide the user with a functionality in the virtual environment that is similar to the ability to make notes and sketches on scratch paper, whiteboards, sticky notes and the like in the real world environment. Thus, in a system and method, in accordance with implementations described herein, a virtual notation surface may be materialized in a virtual environment in response to a user input such as, for example, a set user gesture. A size and/or a shape of the virtual notation surface may adjusted, for example, in response to user inputs, before and/or after the user has entered information on the virtual notation surface.

Figure 9:
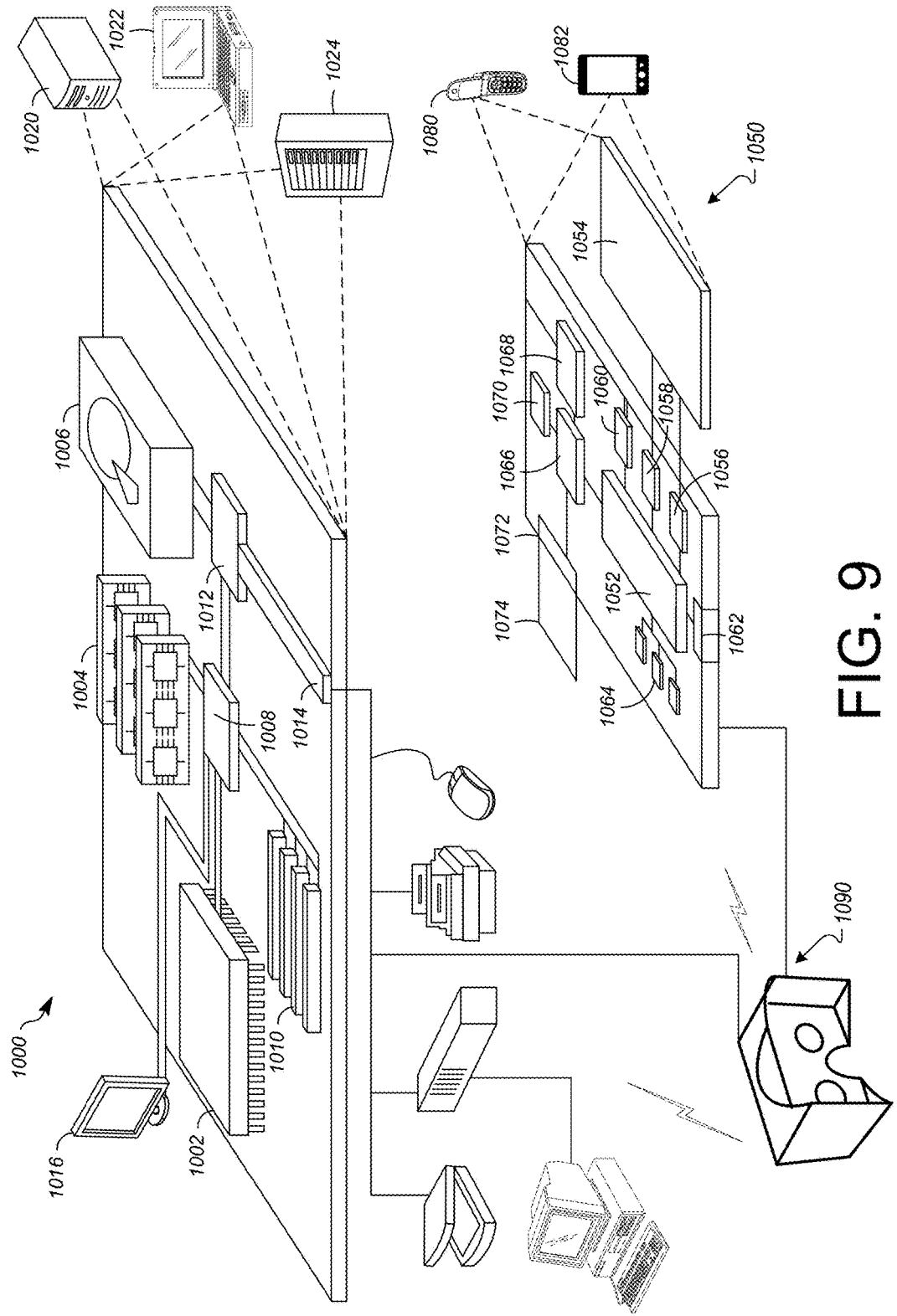
FIG. 9 shows an example of a computer device and a mobile computer device that can be used to implement the techniques described herein.

FIG. 9 shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smart phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with a virtual reality (VR headset/HMD device 1090). For example, one or more sensors included on a computing device 1050 or other computing device depicted in FIG. 10, can provide input to VR headset 1090 or in general, provide input to a VR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the VR space that can then be used as input to the VR space. For example, the computing device 1050 may be incorporated into the VR space as a virtual object, such as a controller, a laser pointer, a keyboard, a weapon, etc. Positioning of the computing device/virtual object by the user when incorporated into the VR space can allow the user to position the computing device so as to view the virtual object in certain manners in the VR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the VR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the VR space can cause a particular action to occur in the VR space.

In some implementations, a touchscreen of the computing device 1050 can be rendered as a touchpad in VR space. A user can interact with the touchscreen of the computing device 1050. The interactions are rendered, in VR headset 1090 for example, as movements on the rendered touchpad in the VR space. The rendered movements can control virtual objects in the VR space.

In some implementations, one or more output devices included on the computing device 1050 can provide output and/or feedback to a user of the VR headset 1090 in the VR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the VR space. In the example of the laser pointer in a VR space, the computing device 1050 appears as a virtual laser pointer in the computer-generated, 3D environment. As the user manipulates the computing device 1050, the user in the VR space sees movement of the laser pointer. The user receives feedback from interactions with the computing device 1050 in the VR environment on the computing device 1050 or on the VR headset 1090.

In some implementations, a computing device 1050 may include a touchscreen. For example, a user can interact with the touchscreen in a particular manner that can mimic what happens on the touchscreen with what happens in the VR space. For example, a user may use a pinching-type motion to zoom content displayed on the touchscreen. This pinching-type motion on the touchscreen can cause information provided in the VR space to be zoomed. In another example, the computing device may be rendered as a virtual book in a computer-generated, 3D environment. In the VR space, the pages of the book can be displayed in the VR space and the swiping of a finger of the user across the touchscreen can be interpreted as turning/flipping a page of the virtual book. As each page is turned/flipped, in addition to seeing the page contents change, the user may be provided with audio feedback, such as the sound of the turning of a page in a book.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the VR space to control objects in the VR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method, comprising:
   detecting, from one of a first user or a second user in a shared virtual environment, a selection input corresponding to a selection of a virtual notation surface, of a plurality of virtual notation surfaces available to the first user and the second user;
   displaying the selected virtual notation surface as a first virtual object in the shared environment in response to the selection input;
   detecting a first gesture input from the first user;
   annotating the selected virtual notation surface with a first annotation in response to the detection of the first gesture;
   detecting a second gesture input from the second user;
   annotating the selected virtual notation surface with a second annotation in response to the detection of the second gesture; and
   displaying the annotated virtual notation surface including the first annotation and the second annotation in the shared virtual environment.

2. The method of claim 1, wherein annotating the selected virtual notation surface includes:
   detecting and tracking movement of a marking implement; and
   annotating the virtual notation surface in response to the detected movement of the marking implement.

3. The method of claim 2, wherein detecting and tracking movement of a marking implement includes:
   detecting actuation of a manipulation device of the marking implement;
   initiating tracking of the movement of the marking implement in response to the detected actuation of the manipulation device;
   detecting release of the actuation of the manipulation device; and
   terminating tracking of the movement of the marking implement in response to the detected release of the manipulation device.

4. The method of claim 3, wherein annotating the virtual notation surface in response to the detected movement of the marking implement includes:
   detecting a contour corresponding to the tracked movement of the marking implement; and
   annotating the virtual notation surface with a contour corresponding to the detected contour of the movement of the marking implement.

5. The method of claim 1, wherein annotating the selected virtual notation surface includes:
   detecting a selection of a virtual feature of a plurality of virtual features; and
   annotating the virtual notation surface to include the selected virtual feature in response to the detected selection.

6. The method of claim 1, wherein detecting the selection input comprises detecting, from the one of the first user or the second user, a first selection input corresponding to the selection of the virtual notation surface of the plurality of virtual notation surfaces, the method further comprising:
   detecting, from the other of the first user or the second user, a second selection input corresponding to a selection of the virtual notation surface including the first annotation;
   retrieving the virtual notation surface including the first annotation in response to the second selection input; and
   further annotating the selected virtual notation surface with the second annotation in response to the detection of the second gesture.

7. The method of claim 1, further comprising:
   detecting a third gesture input from one of the first user or the second user;
   removing at least one of the first annotation or the second annotation from the virtual notation surface; and
   displaying the annotated virtual notation surface including the other of the first annotation or the second annotation as a third virtual object in the shared virtual environment.

8. The method of claim 1, further comprising setting at least one of a size or a shape of the virtual notation surface in response to detected relative of a first handheld electronic device and a second handheld electronic device relative to the virtual notation surface.

9. The method of claim 8, wherein setting the at least one of the size or the shape of the virtual notation surface includes:
   detecting a position of the first handheld electronic device relative to a first portion of the virtual notation surface;
   detecting a position of the second handheld electronic device relative to a second portion of the virtual notation surface;
   detecting a release of an actuation of a manipulation device of at least one of the first handheld electronic device or the second handheld electronic device; and
   setting the at least one of a size or a shape of the virtual notation surface in response to the detected release of the actuation of the manipulation device.

10. The method of claim 9, wherein setting the at least one of a size or a shape of the virtual notation surface in response to the detected release of the actuation of the manipulation device includes:
    detecting the position of the first handheld electronic device relative to the first portion of the virtual notation surface at a point at which the release of the actuation of the manipulation device is detected;
    detecting the position of the second handheld electronic device relative to the second portion of the virtual notation surface at the point at which the release of the actuation of the manipulation device is detected; and
    setting the at least one of the size or the shape of the virtual notation surface based on the position of the first handheld device and the position of the second handheld device at the point at which the release of the actuation of the manipulation device is detected.

11. The method of claim 1, further comprising:
    displaying, on a display of a head mounted display (HMD) device, the shared virtual environment;
    detecting, outside of the HMD, an initial gesture input from the first user or the second user;
    generating, in response to the detection of the initial gesture input, a blank virtual notation surface, the plurality of virtual notation surfaces including the blank virtual notation surface; and displaying the blank virtual notation surface as a virtual object in the shared virtual environment for annotation by at least one of the first user or the second user.

12. A system, comprising:
a computing device configured to generate a virtual reality environment, the computing device including:
a memory storing executable instructions; and
a processor configured to execute the instructions, to cause the computing device to:
detect, from one of a first user or a second user in a shared virtual environment, a selection input corresponding to a selection of a virtual notation surface, of a plurality of virtual notation surfaces available to the first user and the second user;
display the selected virtual notation surface as a first virtual object in the shared environment in response to the selection input;
detect a first gesture input from the first user;
annotate the selected virtual notation surface with a first annotation in response to the detection of the first gesture;
detect a second gesture input from the second user;
annotate the selected virtual notation surface with a second annotation in response to the detection of the second gesture; and
display the annotated virtual notation surface including the first annotation and the second annotation in the shared virtual environment.

13. The system of claim 12, wherein, in annotating the selected virtual notation surface, the instructions cause the computing device to detect and track movement of a marking implement, including:
detect actuation of a manipulation device of the marking implement;
initiate tracking of the movement of the marking implement in response to the detected actuation of the manipulation device;
detect a release of the actuation of the manipulation device;
terminate tracking of the movement of the marking implement in response to the detected release of the manipulation device; and
annotate the virtual notation surface in response to the detected movement of the marking implement.

14. The system of claim 13, wherein, in annotating the virtual notation surface in response to the detected movement of the marking implement, the instructions cause the computing device to:
detect a contour corresponding to the tracked movement of the marking implement; and
annotate the virtual notation surface with a contour corresponding to the detected contour of the movement of the marking implement.

15. The system of claim 12, wherein, in annotating the selected virtual notation surface, the instructions cause the computing device to:
detect a selection of a virtual feature of a plurality of virtual features; and
annotate the virtual notation surface to include the selected virtual feature in response to the detected selection.

16. The system of claim 12, wherein, in detecting the selection input, the instructions cause the computing device to:

detect, from the one of the first user or the second user, a first selection input corresponding to the selection of the virtual notation surface of the plurality of virtual notation surfaces;
detect, from the other of the first user or the second user, a second selection input corresponding to a selection of the virtual notation surface including the first annotation;
retrieve the virtual notation surface including the first annotation in response to the second selection input; and
further annotate the selected virtual notation surface with the second annotation in response to the detection of the second gesture.

17. The system of claim 12, wherein the instructions also cause the computing device to:
detect a third gesture input from one of the first user or the second user;
remove at least one of the first annotation or the second annotation from the virtual notation surface; and
display the annotated virtual notation surface including the other of the first annotation or the second annotation as a third virtual object in the shared virtual environment.

18. The system of claim 12, wherein the instructions also cause the computing device to:
set at least one of a size or a shape of the virtual notation surface in response to detected positions of a first handheld electronic device and a second handheld electronic device relative to the virtual notation surface, including:
detect a position of the first handheld electronic device relative to a first portion of the virtual notation surface;
detect a position of the second handheld electronic device relative to a second portion of the virtual notation surface;
detect a release of an actuation of a manipulation device of at least one of the first handheld electronic device or the second handheld electronic device; and
set the at least one of a size or a shape of the virtual notation surface in response to the detected release of the actuation of the manipulation device.

19. The system of claim 12, wherein the instructions also cause the computing device to:
set at least one of a size or a shape of the virtual notation surface in response to a detected release of an actuation of a manipulation device of one of a first handheld electronic device or a second handheld electronic device, including:
detect the position of the first handheld electronic device relative to the first portion of the virtual notation surface at a point at which the release of the actuation of the manipulation device is detected;
detect the position of the second handheld electronic device relative to the second portion of the virtual notation surface at the point at which the release of the actuation of the manipulation device is detected; and
set the at least one of the size or the shape of the virtual notation surface based on the position of the first handheld device and the position of the second handheld device at the point at which the release of the actuation of the manipulation device is detected.

* * * * *

UNITED STATES PATENT AND TRADEMARK OFFICE
CERTIFICATE OF CORRECTION

PATENT NO. : 10,339,723 B2  
APPLICATION NO. : 16/124536  
DATED : July 2, 2019  
INVENTOR(S) : Yamamoto et al.

Page 1 of 1

It is certified that error appears in the above-identified patent and that said Letters Patent is hereby corrected as shown below:

In the Claims

In Column 20, Claim 11, Line 61, delete "(HIVID)" and insert -- (HMD) --, therefor.

Signed and Sealed this  
Seventeenth Day of December, 2019

Andrei Iancu  
*Director of the United States Patent and Trademark Office*